US 6,668,637 B2

(12) United States Patent
Ono et al.

(10) Patent No.: US 6,668,637 B2
(45) Date of Patent: *Dec. 30, 2003

(54) TIRE AIR PRESSURE ESTIMATING APPARATUS

(75) Inventors: Eiichi Ono, Aichi-ken (JP); Katsuhiro Asano, Aichi-ken (JP); Takaji Umeno, Aichi-ken (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/964,621

(22) Filed: Sep. 28, 2001

(65) Prior Publication Data

US 2002/0059826 A1 May 23, 2002

(30) Foreign Application Priority Data

Sep. 29, 2000 (JP) .................................. 2000-300710
Sep. 12, 2001 (JP) .................................. 2001-276997

(51) Int. Cl.[7] .............................................. B60C 23/02
(52) U.S. Cl. ...................... 73/146.5; 73/146; 73/146.2; 73/146.3; 73/78; 152/415
(58) Field of Search .......................... 73/146.5, 146.3, 73/146, 865.9, 146.2, 78; 340/444; 701/41, 36, 37, 65; 152/415

(56) References Cited

U.S. PATENT DOCUMENTS

| | | | | | |
|---|---|---|---|---|---|
| 5,596,141 A | * | 1/1997 | Nishikawa et al. | ........ | 73/146.2 |
| 5,826,207 A | * | 10/1998 | Ohashi et al. | ............ | 73/146.2 |
| 5,913,241 A | * | 6/1999 | Ohashi et al. | ............ | 73/146.2 |
| 6,064,931 A | * | 5/2000 | Sawada et al. | ............ | 73/146.5 |
| 6,092,028 A | * | 7/2000 | Naito et al. | .................... | 702/47 |
| 6,109,099 A | * | 8/2000 | Kawai et al. | .............. | 73/146.5 |
| 6,142,026 A | * | 11/2000 | Ohashi et al. | ............ | 73/865.9 |
| 6,324,461 B1 | * | 11/2001 | Yamaguchi et al. | .......... | 701/80 |
| 6,450,020 B1 | * | 9/2002 | Naito et al. | ................ | 73/146.2 |
| 6,508,102 B1 | * | 1/2003 | Margolis et al. | ................ | 73/8 |

FOREIGN PATENT DOCUMENTS

JP          8-164720         6/1996

* cited by examiner

*Primary Examiner*—Edward Lefkowitz
*Assistant Examiner*—Alandra Ellington
(74) *Attorney, Agent, or Firm*—Oblon, Spivak, McClelland, Maier & Neustadt, P.C.

(57) ABSTRACT

Tire air pressure during high speed travel is estimated without a sensor for detecting the tire air pressure directly. An apparatus is constituted by a wheel speed sensor, road surface friction state estimator for estimating a friction state estimation value representing friction between the tire and a road surface from wheel speed detected by the wheel speed sensor, tire air pressure estimator for estimating any reduction in the tire air pressure based on the friction state estimation value, and a display for displaying the estimated reduction in the tire air pressure.

20 Claims, 20 Drawing Sheets

F I G. 1
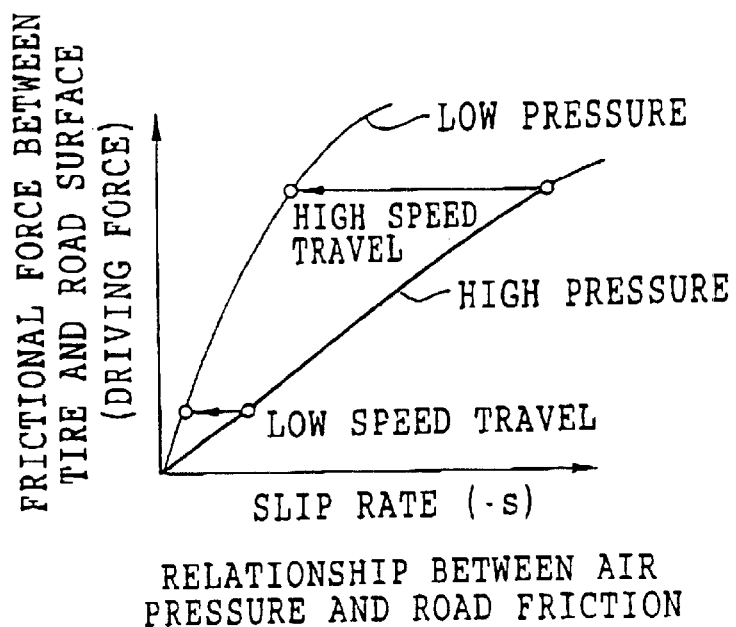
RELATIONSHIP BETWEEN AIR
PRESSURE AND ROAD FRICTION
F I G. 2
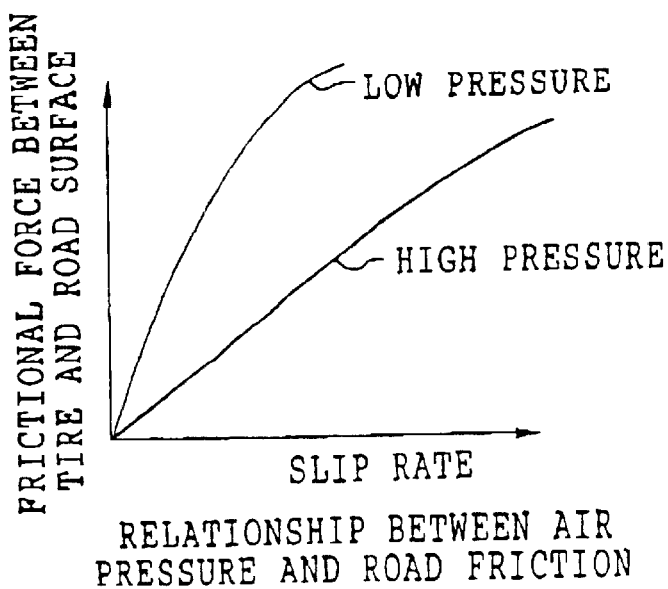
RELATIONSHIP BETWEEN AIR
PRESSURE AND ROAD FRICTION FREQUENCY RESPONSE to WHEEL SPEED from
ROAD SURFACE DISTURBANCES
(BRAKING FORCE GRADIENT = 300 TO 10,000 Ns/m)

F I G. 8
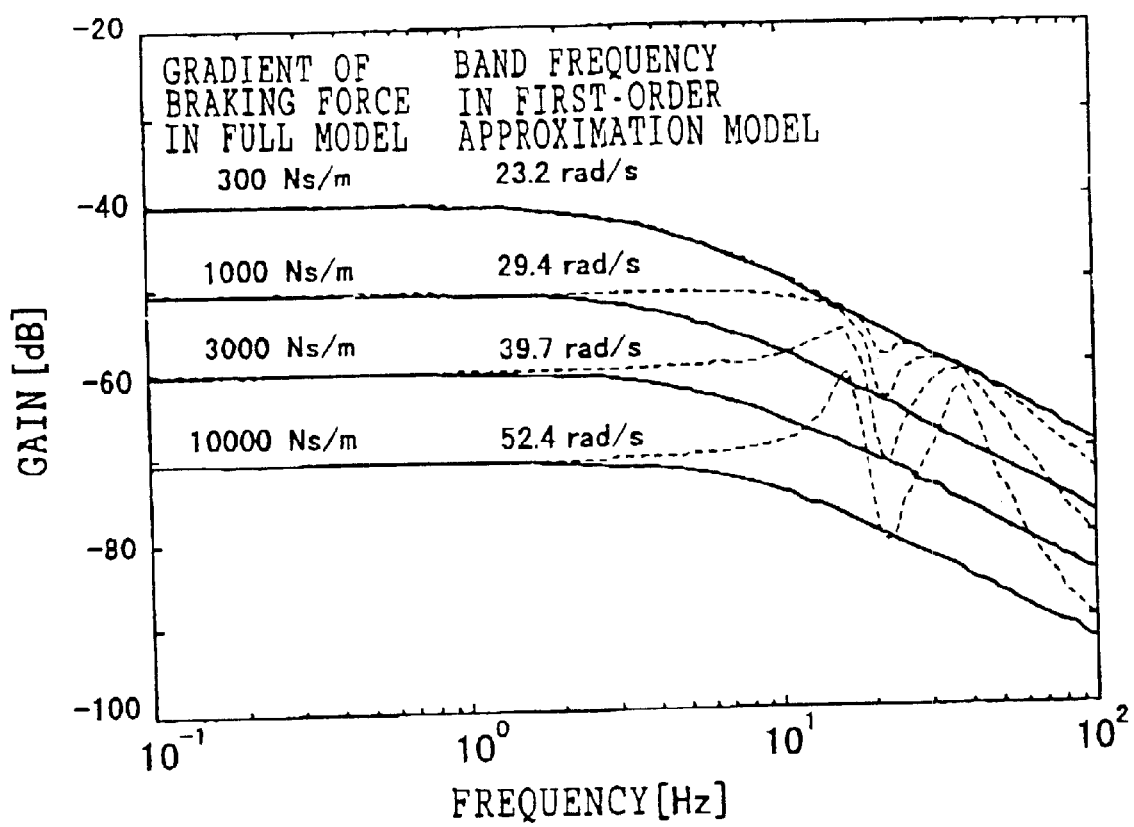

F I G. 1 1
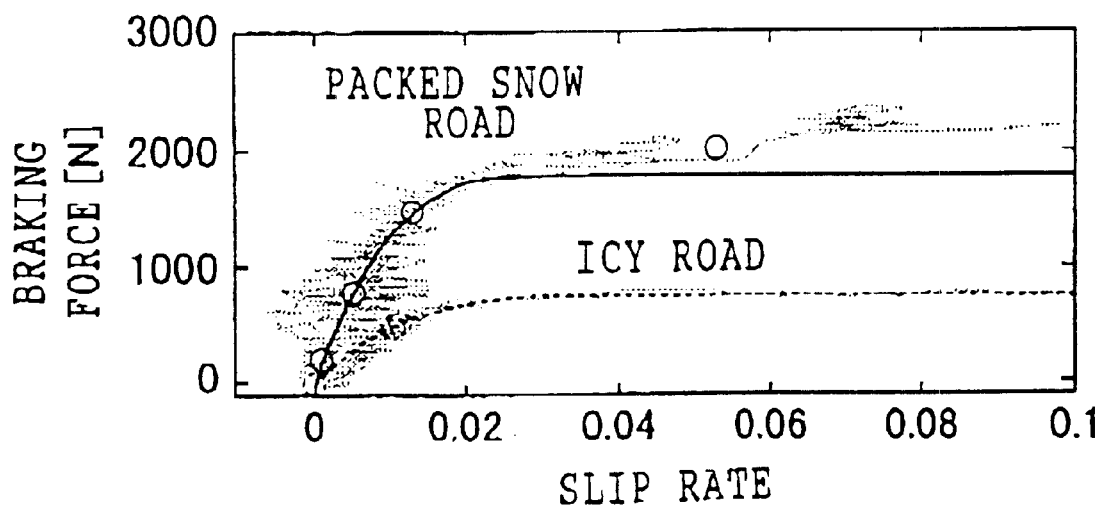
F I G. 1 2
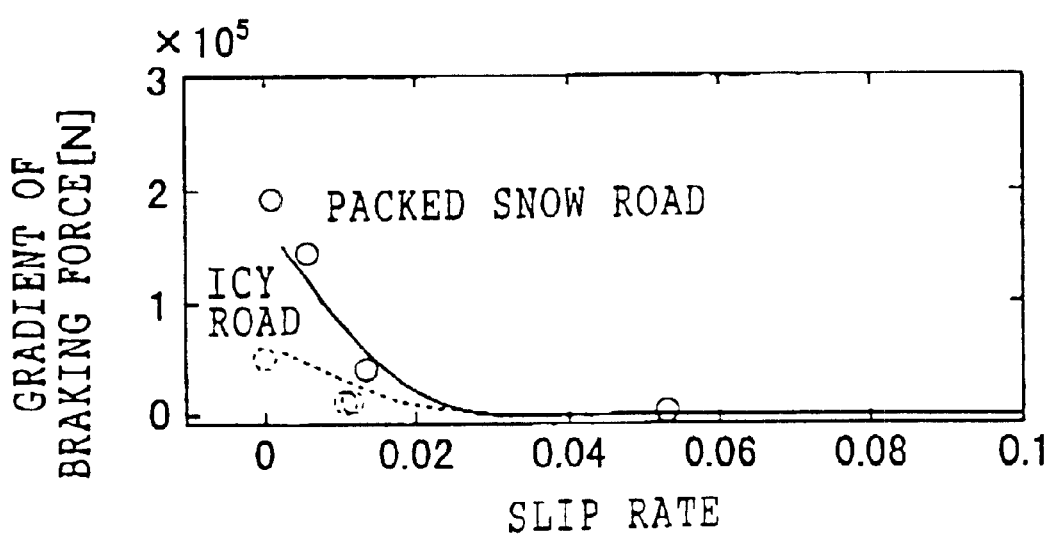

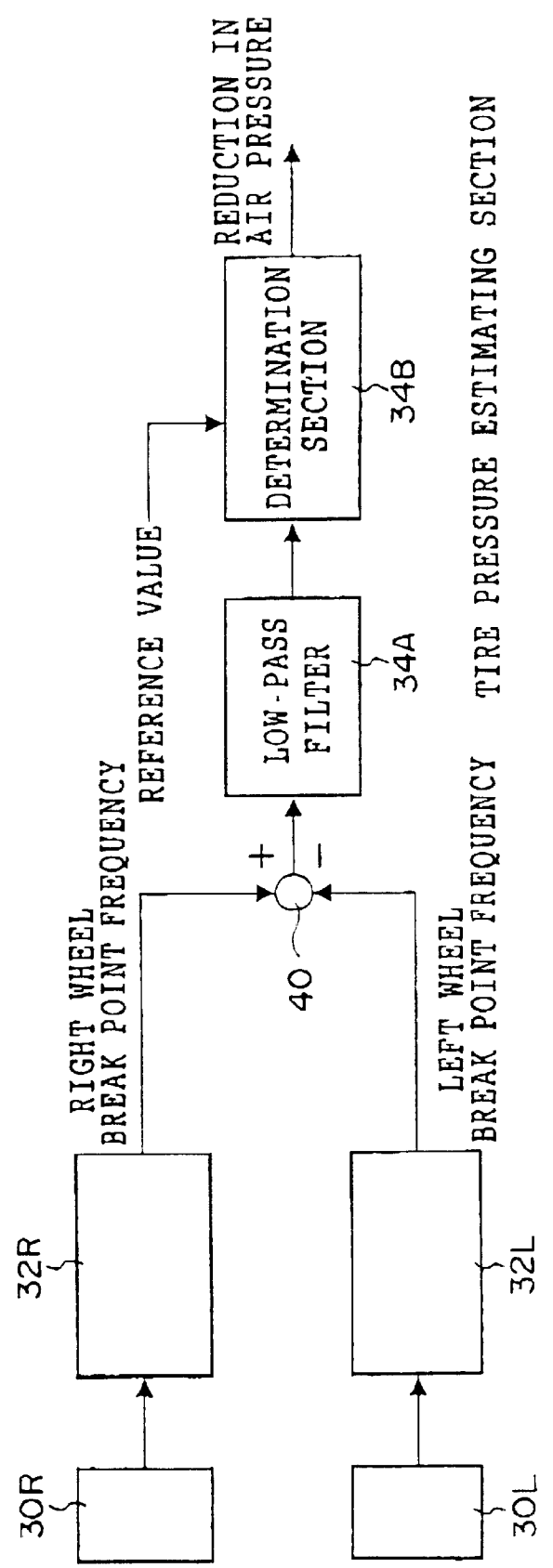

RESULTS OF ESTIMATION OF BREAK POINT
FREQUENCY DIFFERENCES (170 km/h)

REDUCTION IN VIBRATION LEVELS RESULTING
FROM A REDUCTION IN AIR PRESSURE

RESULTS OF ESTIMATION OF VIBRATION LEVEL
DIFFERENCES (200 km/h)

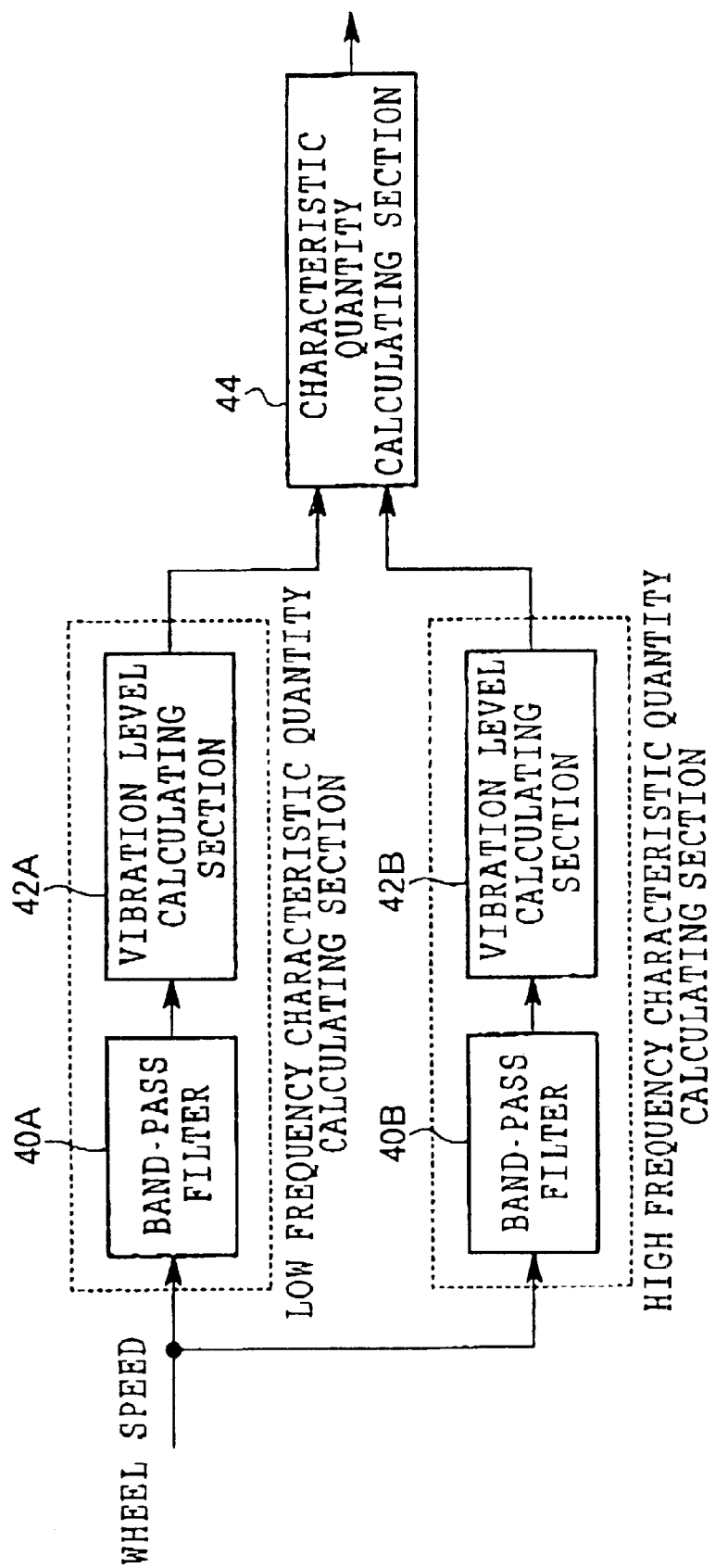
F I G. 1 9

F I G. 2 4
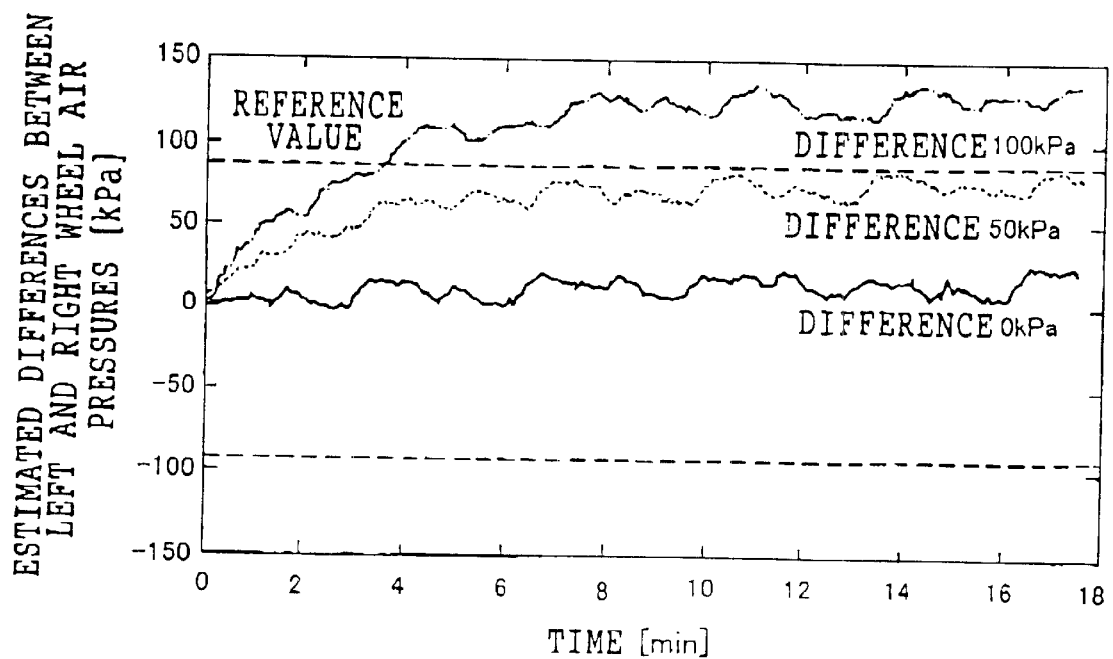

TIRE AIR PRESSURE ESTIMATING APPARATUS

BACKGROUND OF THE PRESENT INVENTION

1. Field of the Present Invention

The present invention relates to a tire air pressure estimating apparatus and, more particularly, to a tire air pressure estimating apparatus which estimates a friction state estimation value representing friction state between a tire and a road surface and which estimates a reduction of the tire air pressure based on the estimated friction state estimation value, without using a sensor for directly measuring the tire air pressure.

2. Description of the Related Art

For the purpose of detecting tire air pressure, it has been proposed to provide a pressure sensor in the tire to detect the tire air pressure directly. However, this method of directly detecting the tire air pressure has a problem in that a cost increase results from the need to provide a sensor in each tire. Further, when a vehicle is traveling at high speed, detection signals from the sensors can not be efficiently transmitted to the body of the vehicle, which makes it difficult to detect the tire air pressures.

Japanese Patent Application Laid-Open (JP-A) No. 8-164720 disclosed a technique of detecting an increase in angular velocity of rotation of a tire (wheel angular velocity), to thereby detect any reduction in the dynamic load radius of the tire, which is attributable to a reduction in the tire air pressure. This technique is now described in more detail. The following relationship exists between wheel angular velocity $\omega$, vehicle speed v, slip rate s ($-1<s<0$ during driving), and dynamic load radius r during driving.

$$s=(v-r\omega)/r\omega \qquad (1)$$

Equation (1) can be re-arranged as follows with respect to the wheel angular velocity.

$$\omega=v/\{(1+s)r\} \qquad (1')$$

Therefore, in a low speed range at which great driving force is not required, the slip rate is small, so that a reduction of the dynamic load radius is detected as an increase in the wheel angular velocity. It is, for example, possible to detect a reduction in air pressure of one of left and right wheels caused by a puncture or the like, by detecting a difference between the angular velocities of the wheels.

However, as will be understood from the relationship shown in FIG. 1 between tire air pressure, frictional force between the tire and a road surface (which is equivalent to a driving force), and slip rate, the slip rate is changed significantly by a reduction in tire air pressure during high speed travel at which a greater driving force is required to overcome air resistance, compared to change of the slip rate during low speed travel at which this great driving force is not required. As the slip rate s ($-1<s<0$) consequently approaches 0, the term (1+s) in Equation (1') increases.

Accordingly, during high speed travel, the effect of a reduction in the dynamic load radius attributable to the reduction in tire air pressure and the effect of the increase of the term (1+s) are opposed by each other, and the reduction in the tire air pressure does not noticeably affect the wheel angular velocity of the driving wheel during high speed travel. This results in a problem that the accuracy of detection of the reduction in the tire air pressure of the driving wheel is reduced during high speed travel at which the greater driving force is required.

SUMMARY OF THE PRESENT INVENTION

The present invention has been conceived to solve the above problem, and it is an object of the present invention to provide a tire air pressure estimating apparatus capable of estimating tire air pressure of a driving wheel, even during high speed travel, without using a sensor that detects the tire air pressure directly.

The principle of the present invention will now be described. An increase in ground contact area of a tire as a result of a reduction in tire air pressure appears as a change in friction state between the tire and a road surface. As shown in FIG. 2, which is similar to FIG. 1, the gradient of a tangent of a curve representing a relationship between a frictional force between the tire and the road surface and a slip rate (or slip speed), which is a $\mu$-gradient of the road surface, increases as the tire air pressure decreases. That is, the $\mu$-gradient of the road surface increases as the tire air pressure decreases.

An increase in the $\mu$-gradient of the road surface can be estimated such that $\mu$-gradient of the road surface is estimated using a road surface $\mu$-gradient estimating technique, which is based on a wheel deceleration model, and an increase thereof is estimated. Alternatively, an increase in the $\mu$-gradient of the road can be estimated by estimating an increase in break point frequency that results from the increase in the $\mu$-gradient of the road surface, as will be described later, or by detecting a reduction in a vibration level at a special frequency. A gradient of braking force is represented by a gradient of a tangent of a curve that represents a relationship between slip speed (or, slip rate) and braking force. A gradient of driving force applied to the tire is represented by a gradient of a tangent of a curve that represents a relationship between slip speed (or, slip rate) and driving force. The gradient of braking force and the gradient of driving force are both physical quantities representing slipperiness between the tire and the road surface, or an estimation value of friction state representing friction state between the tire and the road surface. The gradient of braking force and the gradient of driving force are physical quantities equivalent to the $\mu$-gradient of the road surface, which represents grip state of the tire. Therefore, estimation of an increase in the $\mu$-gradient of the road surface will be described by describing estimation of an increase in the gradient of braking force.

As shown in FIG. 3, a dynamic model of a wheel resonance system can be represented by a model in which torsional spring elements 14 and 16 of a tire, having respective spring constants K1 and K2, are interposed between a rim 10 and a belt 12 and in which a suspension element, provided by connecting a spring element 18 having a spring constant K3 in parallel with a damper 20, is interposed between the rim 10 and a vehicle body. In this model, a disturbance from the road surface (road surface disturbance) is transmitted from the belt 12 through the spring elements 14 and 16 to the rim 10, to affect a wheel speed $\omega$, and is transmitted to the vehicle body through the suspension element.

A description is now given of characteristics of transmission from road surface disturbance to the wheel speed for the braking force gradient, using a fifth order full wheel model, in which a first order wheel decelerating motion, second order longitudinal direction suspension resonance, and second order tire rotation resonance are integrated.

FIG. 4 is a gain diagram showing frequency responses from road surface disturbance to the wheel speed for ranges from a limit braking range to a low slip range where there is some margin for tire characteristics (for ranges from a range at which the braking force gradient is 300 Ns/m to a range at which the braking force gradient is 10000 Ns/m). That is, the diagram shows the relationship between frequency and gain of amplitude of the wheel speed with respect to amplitude of the road surface disturbance.

The wheel speed frequency characteristics in FIG. 4 indicate that, when the braking force gradient is relatively small, such as near the limit of friction force between a tire and a road, the gain is great in a low frequency range and is small in a high frequency range. Namely, for the range where the braking force gradient is small, there is a big difference between the gain in the low frequency range and the gain in the high frequency range.

In contrast, the gain in the low frequency range for the range where the braking force gradient is relatively large, such as a stationary traveling region, is much smaller compared to those for the range where the braking force gradient is relatively small, in the wheel speed frequency characteristics. Further, in the high frequency range, the gain for the range where the braking force gradient is relatively large is not much smaller than the gain for the range where the braking force gradient is relatively small because of the influence of generation of rotational resonance of the tire (near 40 Hz) or the like. Therefore, for the range where the braking force gradient is relatively large, there is only a small difference between the gain in the low frequency range and the gain in the high frequency range. A difference between the vibration level of wheel speed signal in the low frequency range and the vibration level of wheel speed signal in the high frequency range changes similarly to the difference between the low frequency range gain and the high frequency range gain.

It is apparent from the above that a difference between the low frequency range gain and the high frequency range gain or between the wheel speed signal vibration levels in the low frequency range and the wheel speed signal vibration levels in the high frequency range decreases as the braking force gradient increases. Utilizing this characteristic, an increase in the braking force gradient (an increase in the $\mu$-gradient of the road surface) can be estimated from the above-described differences. The change in the $\mu$-gradient of the road surface which is attributable to the change in the braking force gradient is described above, an increase in the $\mu$-gradient which is attributable to an increase in ground contact length due to a decrease in tire air pressure can be detected similarly. Accordingly, it is made possible to estimate a reduction in the tire air pressure. In the above description, "difference (for example, the difference between gains)" is used, but "ratio (for example, the ratio of gains)" may just as well be used.

Referring to the frequency band near 40 Hz in FIG. 4 at which rotational resonance (torsional resonance) of the tire occurs, the greater the braking force gradient, the sharper the peak waveform of rotational resonance of the tire. Further, as the braking force gradient becomes greater, the overall frequency characteristics of the peak waveform moves to higher frequency range. Similarly, if the wheel characteristics are approximated by a first-order lag model, it can be understood that a break point frequency becomes higher as the braking force gradient becomes greater, as shown in FIG. 8.

It is therefore possible to estimate an increase in the braking force gradient (an increase in the road surface $\mu$-gradient) from a break point frequency of transmission characteristics from the road disturbance to the wheel speed, by approximating the characteristics of the wheel with a first-order lag model and estimating the break point frequency, which is a frequency at which the gain changes from a value in a predetermined range to a value out of the predetermined range. This makes it possible to estimate a reduction in the tire air pressure. Lag models of the second and third orders and the like have characteristics substantially similar to those of the first-order lag model. Therefore, it is possible to estimate an increase in the braking force gradient from the value of the break point frequency in the same manner as described above, by approximating wheel characteristics with the lower order lag model and estimating the break point frequency of the transmission characteristics of the wheel.

Also, in the PSD (Power Spectral Density) of wheel speed signal as shown in FIG. 25, torsional resonance in frequency near 40 Hz is small in high speed travelling, and resonance characteristics is scarcely observed when the tire air pressure is normal. On the other hand, when the tire air pressure decreases, the vibration level of the wheel speed signal, especially in a range from an unsprung resonance frequency to a torsional resonance frequency, decreases. Accordingly, referring to high frequency cut off characteristics of a low frequency range including frequency lower than the torsional resonance frequency, the gain in a high frequency range which range is higher than the low frequency range is relatively increase (When the tire air pressure decreases, because the gain in the low frequency range including frequency lower than the torsional resonance frequency decreases). Accordingly, the tire air pressure can be estimated by referring the change in the break point frequency and the change in the vibration level of wheel speed signal, namely, the change in frequency cut off characteristics.

Further, in a case of a plurality of wheels, because it is assumed that respective input disturbance levels from the road surface of the plurality of wheels are the same, an air pressure reduction of at least one of the plurality of wheels can be determined by comparing changes of the plurality of wheels (change in frequency cut off characteristics in frequency range including frequency lower than the torsional resonance frequency, which is attributable to an increase in ground contact length of the road surface and the tire due to generation of an tire air pressure reduction, in a wheel speed frequency characteristics).

It is preferable that the high frequency cut off characteristics to be referred is, from FIG. 25, a high frequency cut off characteristics in frequency range including frequency lower than the torsional resonance frequency. It is more preferable that the high frequency cut off characteristics to be referred is a high frequency cut off characteristics in frequency range which is lower than or equal to the torsional resonance frequency and more than or equal to an unprung resonance frequency. Instead of the high frequency cut off characteristics, a change in vibration levels is used. It is preferable that the vibration level to be referred is the vibration level in frequency range including frequency lower than the torsional resonance frequency, more preferably, in frequency range which is lower than or equal to the torsional resonance frequency, further preferably, in frequency range which is lower than or equal to the torsional resonance frequency and more than or equal to an unprung resonance frequency.

The present invention has been conceived based on the above-described principle. A configuration in a first aspect of the present invention includes a wheel speed sensor for detecting a wheel speed; a road surface friction state estimator for estimating a friction state estimation value which represents friction state between a road surface and a tire on the basis of the wheel speed detected by the wheel speed sensor; and a tire air pressure estimator for estimating pressure of the tire on the basis of the friction state estimation value estimated by the road surface friction state estimator. A configuration in a second aspect of the present invention includes a wheel speed sensor for detecting a wheel speed of a single wheel; a road surface friction state estimator for estimating a friction state estimation value, which represents friction between a tire and a road surface, based on the wheel speed detected by the wheel speed sensor; and a tire air pressure estimator for estimating pressure of the tire on the basis of the friction state estimation value estimated by the road surface friction state estimator.

A configuration in a third aspect of the present invention includes wheel speed sensors for detecting respective wheel speeds of a plurality of wheels; road surface friction state estimators for, on the basis of the respective wheel speeds of the plurality of wheels detected by the wheel speed sensors, estimating friction state estimation values, which represent friction states between a tire and a road surface; and a tire air pressure estimator for estimating pressures of the tires on the basis of the friction state estimation values estimated by the road surface friction state estimators. The plurality of wheels may be left and right front wheels or left and right rear wheels or a combination of one rear wheel and a front wheel in a diagonal relationship therewith.

When the wheel speed of the single wheel is detected, the road surface friction state estimator in each aspect of the present invention can estimate, as the friction state estimation value, one of: (a) in a transmission characteristics, from road surface disturbance to the wheel speed, approximated to a low order model, a frequency, at which gain changes from a value in a predetermined range to a value out of the predetermined range, in a gain diagram representing a frequency response of the approximated model; and (b) one of a difference or ratio between a characteristic quantity in a low frequency range including frequency lower than a torsional resonance frequency and a characteristic quantity in a high frequency range which is higher than the low frequency range, in a gain diagram representing a frequency response of a transmission characteristics, from the road surface disturbance to the wheel speed. As the characteristic quantity, vibration level of a wheel speed signal may be used. Also, the road surface friction state estimator can also estimate the level of vibration in the wheel speed signal in each frequency band as the friction state estimation value.

When the wheel speeds of the plurality of wheels are detected, the surface friction estimator can estimate, as the friction state estimation value for each of the plurality of the wheels, at least one of: (a) in a transmission characteristics, from road surface disturbance to the wheel speed, approximated to a low order model, a frequency, at which gain changes from a value in a predetermined range to a value out of the predetermined range, in a gain diagram representing a frequency response of the approximated model; (b) a vibration level of a wheel speed signal in a special frequency band; and (c) a vibration level of the wheel speed signal in a special frequency range, the wheel speed signal being obtained by processing using frequency-weighted filter which makes gain high at a higher frequency range of the special frequency range.

A first-order lag model may be used as the above-described lower order model.

As described above, friction state estimation values (such as one of a difference or ratio between a characteristic quantity in a low frequency range including frequency lower than a torsional resonance frequency and a characteristic quantity in a high frequency range which is higher than the low frequency range, in a gain diagram representing a frequency response of a transmission characteristics, from the road surface disturbance to the wheel speed, in a transmission characteristics, from road surface disturbance to the wheel speed, approximated to a low order model, a frequency (break point frequency), at which gain changes from a value in a predetermined range to a value out of the predetermined range, in a gain diagram representing a frequency response of the approximated model, a vibration level of a wheel speed signal in a special frequency band, braking force gradient, driving force gradient, and road surface $\mu$-gradient) are related to the air pressure of a tire, and the friction state estimation values increase when the tire air pressure decreases. It is therefore possible to estimate a reduction in the tire air pressure by estimating an increase in friction state estimation value based on the friction state estimation values.

When the pressures of the tires are estimated based on a difference or ratio between friction state estimation values of a plurality of wheels, as in the third aspect of the present invention, since influence of the road surface is eliminated by obtaining the difference or ratio, the air pressure of one wheel due to puncture or the like can be accurately estimated.

In the second aspect, it is possible that the road surface friction state estimator estimates, as the friction state estimation value, a change in frequency cut off characteristics in a frequency range including frequency lower than a torsional resonance frequency, which is attributable to an increase in ground contact length, in a wheel speed frequency characteristics. In the third aspect, it is possible that the road surface friction state estimator estimates, as the friction state estimation value, one of: a change in frequency cut off characteristics in a frequency range including frequency lower than a torsional resonance frequency, which is attributable to an increase in ground contact length, and a change in vibration suppression characteristics in the frequency range including frequency lower than the torsional resonance frequency, which is attributable to the increase in the ground contact length.

When a tire air pressure is estimated from a detected value of a single wheel, a configuration may be employed which includes: a wheel speed sensor for detecting wheel speed of a single wheel; a tire air pressure estimator for estimating pressure of a tire, on the basis of the estimated wheel speed detected by the wheel speed sensor, from a change in frequency cut off characteristics in a frequency range including frequency lower than a torsional resonance frequency, in a wheel speed frequency characteristics. A configuration may also be employed which includes a wheel speed sensor for detecting wheel speed of a single wheel; a detection section for detecting, based on the wheel speed signal that is output by the wheel speed sensor, a characteristic quantity of the wheel speed signal in a low frequency range including frequency lower than the torsional resonance frequency and a characteristic quantity of the wheel speed signal in a high frequency range which is higher that the low frequency range; and tire air pressure estimator for estimating pressure of a tire by comparing the characteristic quantities detected by the detection section with each other. A configuration may further be employed which includes a wheel speed sensor for detecting wheel speed of a single wheel; a detection section for detecting, based on the wheel speed signal that is output by the wheel speed sensor, a characteristic quantity of the wheel speed signal in each of a plurality of frequency ranges; and tire air pressure estimator for estimating pressure of a tire by comparing the plurality of characteristic quantities detected by the detection section with each other.

When tire air pressures are estimated based on the detected values of a plurality of wheels, A tire air pressure estimating apparatus may comprises: wheel speed sensors for detecting respective wheel speeds of a plurality of wheels; a tire air pressure estimator for estimating pressures of tires, based on the respective wheel speeds of the plurality of wheels that are output (detected) by the wheel speed sensors, from one of: a change in frequency cut off characteristics in a frequency range including frequency lower than a torsional resonance frequency of wheel speed frequency characteristics, and a change in vibration suppression characteristics in the frequency range including frequency lower than the torsional resonance frequency. A configuration may yet further be employed which includes wheel speed sensors for detecting respective wheel speeds of a plurality of wheels; detection sections, for detecting, based on the respective wheel speeds of the plurality of wheels detected by the wheel speed sensors, one of a characteristic quantity of a wheel speed signal in each of a plurality of frequency bands and a characteristic quantity of the wheel speed signal in a special frequency range, the wheel speed signal in the special frequency range being obtained by processing the wheel speed signal using a frequency-weighted filter which makes gain high at the special high frequency range of the frequency range, for each wheel; and tire air pressure estimator for estimating pressures of tires by comparing the respective characteristic quantities of the wheel speed signals detected by the detection section with each other. The vibration level of the wheel speed signal may be used as the characteristic quantity of the wheel speed signal.

BRIEF DESCRIPTION OF THE DRAWINGS

FIG. 1 is a diagram showing relationships between air pressures and friction on a road surface during high speed travel and low speed travel for comparison.

FIG. 2 is a diagram showing relationships between air pressures and friction on a road surface.

FIG. 8 is a gain diagram showing frequency responses from road surface disturbances to wheel speed in a first-order lag model.

FIG. 11 is a diagram for comparing estimated values and actual values of braking force during forward braking.

FIG. 12 is a diagram for comparing estimated values and true values of braking force gradient during forward braking.

FIG. 13 is a block diagram showing a second embodiment of the present invention.

FIG. 19 is a block diagram showing a fourth embodiment of the present invention.

FIG. 24 is a diagram showing results of estimation of pressure differences in the sixth embodiment of the present invention.

DETAILED DESCRIPTION OF PREFERRED EMBODIMENTS

Preferred embodiments of the present invention will now be described. In a first embodiment of the present invention, a change in frequency cut off characteristics in a frequency range including frequency lower than the torsional resonance frequency in the wheel speed frequency characteristics, which is attributable to an increase in ground contact length, is used as a friction state estimation value, and a reduction in tire air pressure of each wheel is estimated. To be more concretely, a transmission characteristics from road surface disturbances to wheel speed is approximated by a first-order lag model; a break point frequency is estimated from frequency response of the first-order lag model on the basis of time series data of the wheel speed; the estimated break point frequency is used as a friction state estimation value; and a reduction in tire air pressure of each wheel is estimated.

Figure 5:
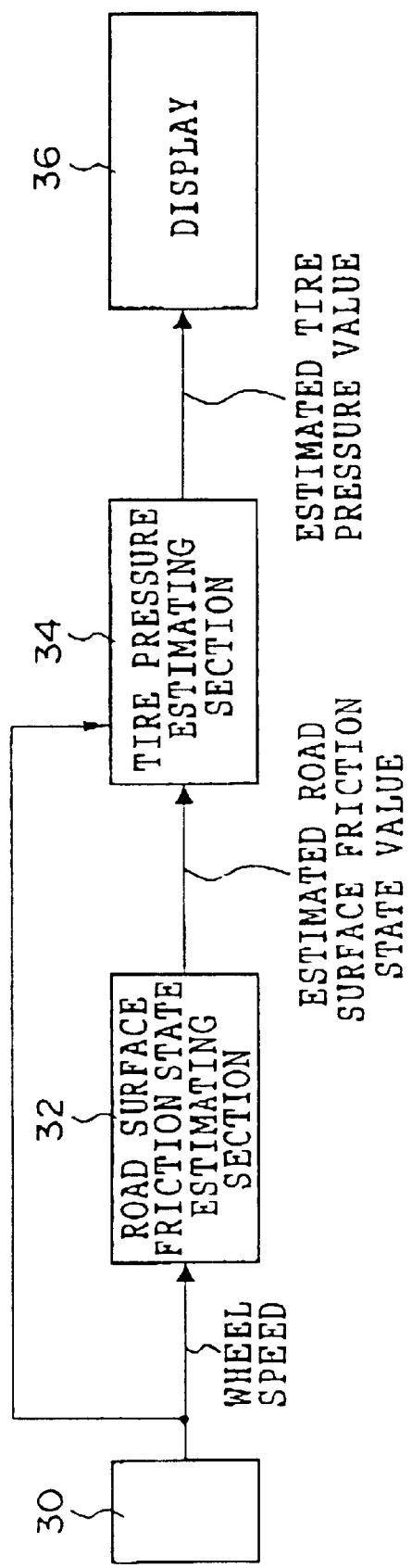
FIG. 5 is a block diagram showing a first embodiment of the present invention.

As shown in FIG. 5, the present embodiment has: a wheel speed sensor 30 for detecting a wheel speed in a predetermined sampling period and outputting time series data of the wheel speed; road surface friction state estimator 32 for estimating an friction state estimation value representing friction between the tire and a road surface from the wheel speed detected by the wheel speed sensor 30; tire air pressure estimator 34 for estimating any reduction in the pressure of the tire based on the friction state estimation value estimated by the road surface friction state estimator 32; and display 36 for displaying an estimated reduction in the tire air pressure. An alarm for warning of a reduction in the tire air pressure may be provided in place of or in combination with the display.

As will be described below, the road surface friction state estimator 32 may be a break point frequency estimator which estimates break point frequency based on the time series data of the wheel speed. The following description will refer to use of the break point frequency estimator as the road surface friction state estimator.

The break point frequency is given as a frequency at which, in a gain diagram that represents a frequency response of a lower order model that approximates a transmission characteristics from road surface disturbances to wheel speed, gain changes from a value in a predetermined range to a value out of the predetermined range. The gain diagram is a diagram representing the relationship between gain and frequency. The gain represents a ratio of output amplitudes (the amplitudes of the time series data of the wheel speed) with respect to input amplitudes (the amplitudes of the road surface disturbances). A first order lag model that approximates this transmission characteristics from road surface disturbance to wheel speed may be used as the lower order model.

Figure 6:
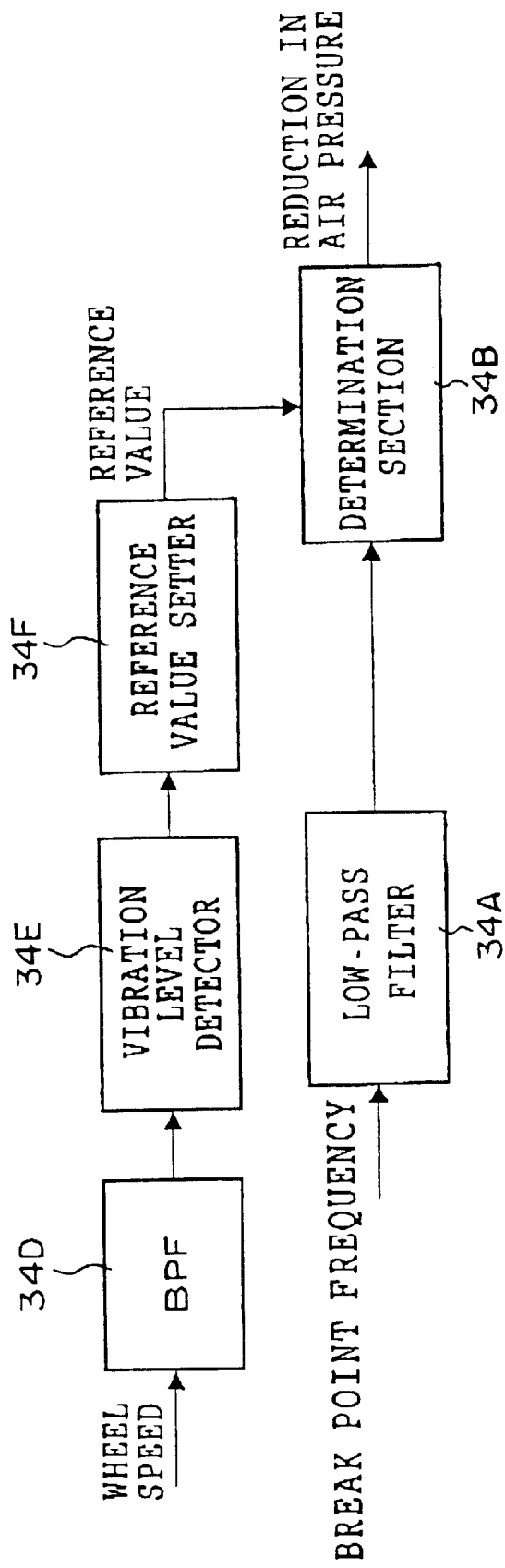
FIG. 6 is a block diagram showing details of a tire air pressure estimator of the first embodiment of the present invention.

As shown in FIG. 6, the tire air pressure estimator 34 has: a low-pass filter 34A, which performs a low-pass filtering process for reducing variations due to noise and the like, which is caused by disturbances from the road, in the estimation of the break point frequency, which is the friction state estimation value estimated by the break point frequency estimator; and determination section 34B, which compares the break point frequency obtained by the low-pass filtering process with a reference value, determines that there is a reduction in the tire air pressure if the break point frequency exceeds the reference value (i.e., if the break point frequency has increased), and then outputs a determination signal indicating a reduction in the tire air pressure. The frequency of the low-pass filter 34A is set at a value that allows variations of the estimation to be reduced but that allows estimated values to adequately follow a change in the tire air pressure at the time of a puncture.

The reference value described above is set by a reference value setting section constituted by a band-pass filter (BPF) 34D that allows time series data of the wheel speed in a predetermined frequency band to pass a vibration level detector 34E that detects a vibration level from the output of the band-pass filter 34D, and a reference value setter 34F that sets the reference value based on the output of the vibration level detector 34E. The reference value is set such that it becomes small as the vibration level of the wheel speed becomes large. The value may alternatively be set in accordance with levels of change in output of a separately provided vertical acceleration sensor.

Operation of the present embodiment will now be described. The break point frequency estimator of the present embodiment identifies a break point frequency of a first-order lag model using a least squares method with an assumption that a white disturbance, that is, a disturbance including all frequencies, is input to the tire from the road.

Figure 3:
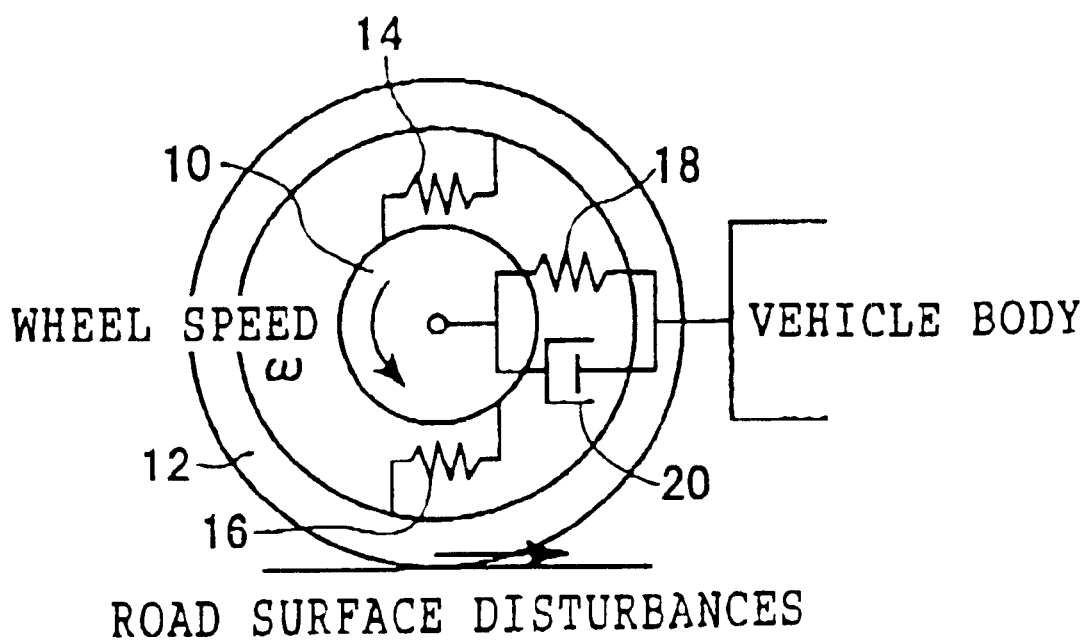
FIG. 3 is a diagram showing a dynamic model for explaining the principle of the present invention.
Figure 7:
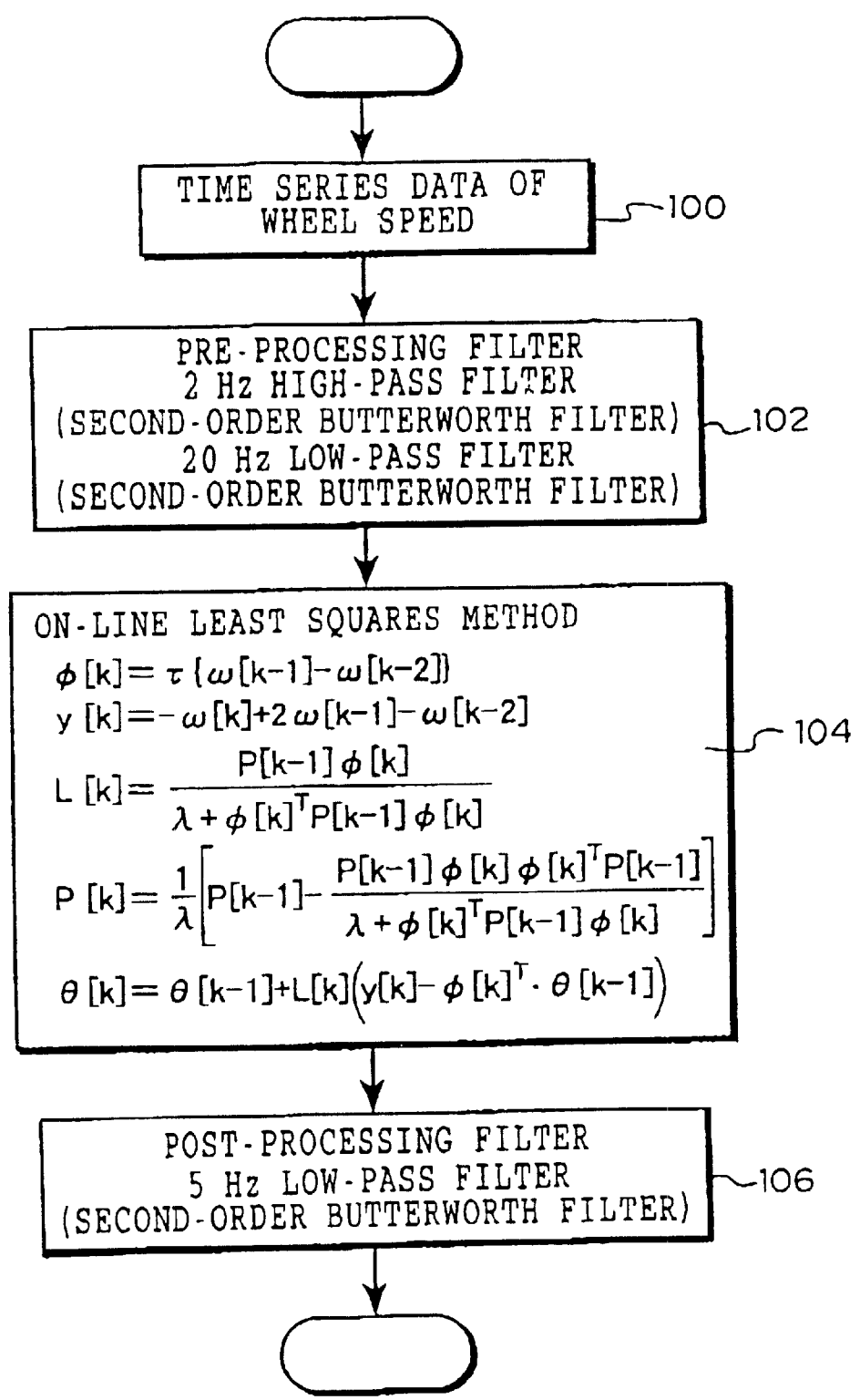
FIG. 7 is a flow chart showing algorithm for estimating a break point frequency in the first embodiment of the present invention.

FIG. 7 shows an algorithm for identifying the break point frequency, and FIG. 8 is a gain diagram of first-order lag model associated with break point frequency identified by the algorithm in FIG. 7 when a white disturbance is applied to the full wheel model of FIG. 3.

First, the algorithm for identifying the break point frequency will be described with reference to FIG. 7. At step 100, data, which is the time series data of the wheel speed detected by the wheel speed sensor 30 with white disturbance added, is acquired and then subjected to a pre-process at step 102 using a second-order Butterworth filter, for example, a filter having a 2 Hz high-pass filter and a 20 Hz low-pass filter. Steady components of acceleration of the wheel can be eliminated by inputting the wheel speed signal to the high-pass filter to perform high-pass filtering, and a smoothing process is performed on the wheel speed signal by the low-pass filtering.

At subsequent step 104, time series data of a break point frequency is estimated from the pre-processed time series data of the wheel speed using the on-line least squares method. First, the time series data of the wheel speed which has been detected by the wheel speed sensor 30, on a discrete basis at sampling period τ, has been subjected to the pre-process by the filter at step 102. Therefore, this time series data of the wheel speed is represented by ω[k] (k represents sampling times based on the sampling period τ as a unit and takes values 1, 2, and so on). Then, the following steps 1 and 2 are repeated. Thus, time series data of a break point frequency is estimated from the detected time series data of the wheel speed.

[Step 1]

$$\phi[k]=\tau\{\omega[k-1]-\omega[k-2]\} \tag{2}$$

$$y[k]=-\omega[k]+2\omega[k-1]-\omega[k-2] \tag{3}$$

φ[k] in Equation 2 is a value obtained by multiplying the quantity of a change in the wheel speed in one sample period by sample period τ (i.e., a physical quantity associated with a change in the wheel speed), and y[k] (a physical quantity associated with a change in a change in the wheel speed) in Equation 3 is a quantity of change in one sample period of the quantity of change (i.e., ω[k−1]−ω[k−2]−ω[k]−ω[k−1]) in the wheel speed in one sample period (ω[k−1]−ω[k−2], ω[k]−ω[k−1]).

[Step 2]

$$\theta[k]=\theta[k-1]+L[k](y[k]-\phi[k]^T\cdot\theta[k-1]) \tag{4}$$

Here, $$L[k] = \frac{P[k-1]\phi[k]}{\lambda + \phi[k]^T P[k-1]\phi[k]} \tag{5}$$

$$P[k] = \frac{1}{\lambda}\left[P[k-1] - \frac{P[k-1]\phi[k]\,\phi[k]^T\,P[k-1]}{\lambda + \phi[k]^T\,P[k-1]\phi[k]}\right] \tag{6}$$

An estimated value θ, i.e., a break point frequency, is estimated from the above recurrence formulae. λ in Equations 5 and 6 represents a forgetting coefficient which indicates the degree of elimination of previous data (for example, λ=0.98), and T represents transposition of a matrix.

θ [k] in Equation 4 is a physical quantity representing history of the physical quantity associated with the change in the wheel speed, i.e., wheel acceleration, and history of the physical quantity associated with the change in wheel acceleration.

While an example of estimation of the break point frequency using the on-line least squares method has been described above, the break point frequency can be estimated using other on-line methods, such as the instrumental variable method and the like.

FIG. 8 shows example of result of estimation of the break point frequency in first-order lag model, estimated as described above. As will be understood from the gain diagram in FIG. 8, each gain of an approximated first-order lag model is identified as a characteristics that passes through steady gain in a full wheel model gain diagram and a gain at an antiresonant point (near 40 Hz) for each braking force gradient other than 300 Ns/m. Suspension longitudinal direction resonance near 15 Hz and resonance characteristics of rotational vibration of the tire near 40 Hz are ignored as a result of use of the lower order model. When a braking force gradient is small (300 Ns/m), no resonance is observed because no antiresonant point is passed in the first-order lag model, which indicates that the vibration characteristics of the first-order lag model and the characteristics of the full wheel model agree with each other well. The reason for this is that a wheel deceleration motion model is dominant in a braking region near the limit, where the braking force gradient is 300 Ns/m or less, because there is less influence of suspension longitudinal direction resonance or resonance of rotational vibration of the tire. It is therefore considered that motion of the wheel can be approximated by the following wheel deceleration motion model in this region near the limit.

$$\dot{v}_w = -\frac{kR_c^2}{J} v_w + w \tag{7}$$

where $v_w$ represents a wheel speed (m/s); w represents a road surface disturbance; k represents a braking force gradient (Ns/m); $R_C$ represents an effective radius of the tire (m); J represents moment of inertia of a vehicle; and a coefficient of a first differentiation of $v_w$ represents the break point frequency.

Equation 7 indicates that the following relationship exists between a break point frequency $\omega_0$ and a braking force gradient in the limit region.

$$\omega_0 = \frac{kR_c^2}{J} \tag{8}$$

Figure 9:
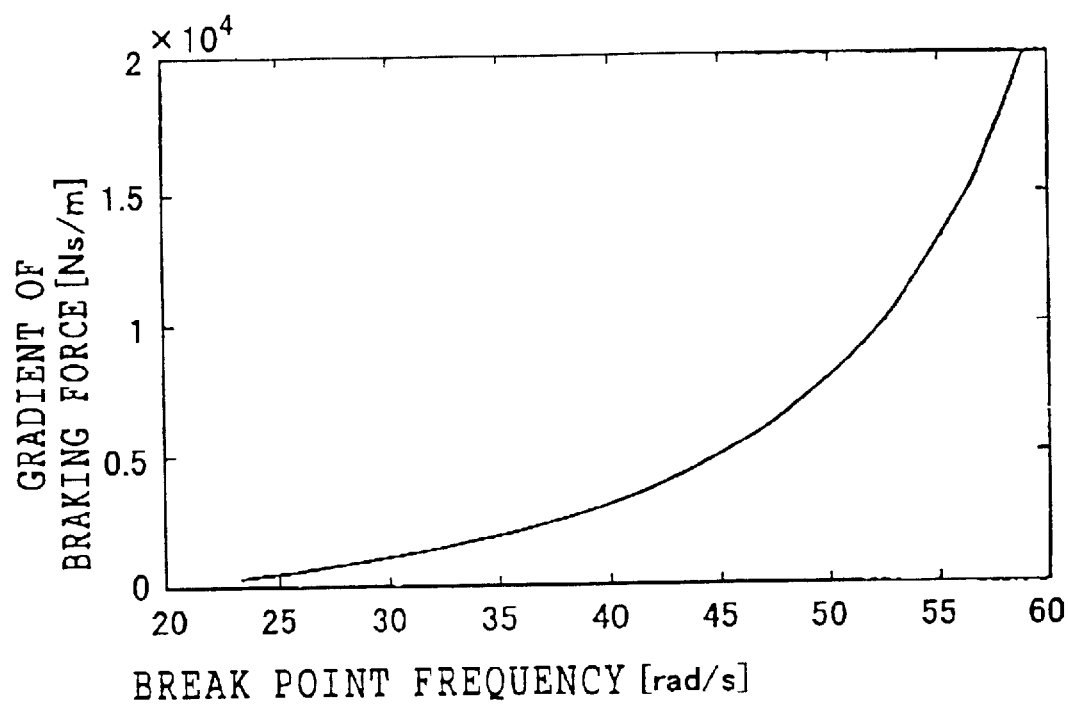
FIG. 9 is a diagram showing a relationship between break point frequency and braking force gradient.

In a low slip region, the relationship shown in FIG. 9 can be derived by using a least squares method. FIG. 9 shows the relationship between braking force gradient in the full wheel model and break point frequency identified from wheel speed data with white disturbance added. The unit of the break point frequencies in FIG. 9 are represented [rad/s]. The braking force gradient monotonously increases as the break point frequency increases. It is therefore possible to estimate an increase in the braking force gradient by estimating an increase in the break point frequency.

[Comparison with Experimental Results]

A description is now given of how the relationship for braking with constant wheel pressure between slip rate and braking force gradient as estimated according to the present embodiment (which is converted into a gradient with respect to slip rate) agrees with true values. These true values were obtained by approximating a relationship between slip rate and braking force for step increases in wheel pressure using a brush model in which load movement is taken into consideration, and calculating the braking force gradient from this approximation model.

First, a description is given of the brush model in which load movement is considered.

Figure 10:
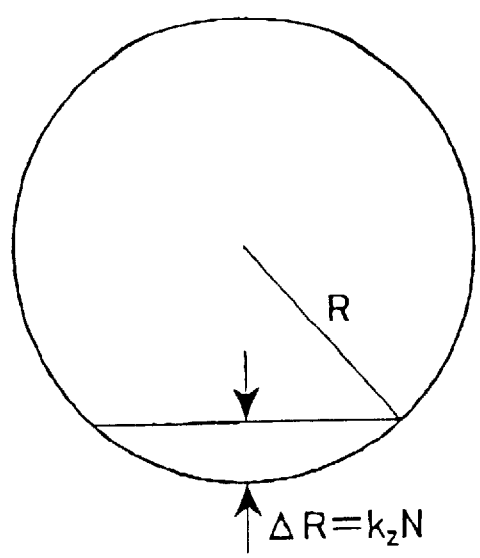
FIG. 10 illustrates displacement of a tire.

If it is assumed that tire displacement AR is proportionate to load N as shown in FIG. 10 ($\Delta R=k_Z N$), brake stiffness $K_S$ is proportionate to the load N as shown below.

$$K_S = k_{S0} N \tag{9}$$

Here, a braking force $F_x$ and a lateral force $F_y$ are expressed as follows.

$$F_x = \mu N \cos(1-\zeta_\tau^3)$$

$$F_y = \mu N \sin(1-\zeta_\tau^3) \tag{10}$$

and $$\zeta_s = 1 - \kappa k_{S0}/(3\mu) \tag{11}$$

where κ represents a combined slip.

If it is assumed that $\kappa_x$, $\kappa_y$, and tan θ represent a longitudinal direction slip, a lateral slip, and a direction of slip, respectively, these are in relationships as shown below.

$$\kappa = \sqrt{(\kappa_x^2 + \kappa_y^2)}$$

$$\kappa_x = (u - R\omega)/(R\omega)$$

$$\kappa_y = K_\beta v/(K_S R\omega)$$

$$\tan \theta = \kappa_x/\kappa_y$$

where ω represents a wheel rotating speed; u represents a longitudinal speed; v represents a lateral speed; and R represents a radius of a dynamic load. If it is assumed that the load N increases in proportion to the lateral force $F_x$, i.e., that $N=N_0+k_N F_x$, the braking force and lateral force can be expressed as follows.

$$F_x = \mu N_0 \cos(1-\zeta_\tau^3)/(1-\mu k_N \cos(1-\zeta_e^3)) \tag{12}$$

$$F_y = \mu N_0 \sin(1-\zeta_\tau^3)/(1-\mu k_N \cos(1-\zeta_\tau^3)) \tag{13}$$

FIG. 11 and FIG. 12 show relationships between slip rates and estimated braking forces and between slip rates and estimated braking force gradients (converted into and shown as gradients with respect to the slip rates) for braking in forward travelling with constant wheel pressure on a road covered with packed snow and on an icy road. Studless tires for a cold climate were used. All of the slip rates, estimated braking forces, and estimated braking force gradients are average values for five seconds after the beginning of braking. The true values indicated by broken lines were obtained by approximating the relationship between the slip rates and braking forces for step increases in the wheel pressures, using a brush model in which the load movement in Equation 12 is taken into consideration, and calculating gradients of the braking forces from this approximation model.

The break point frequency has been identified from the wheel speed, the braking force gradient (gradient of braking force with respect to slip speed) is obtained from the identified break point frequency value using the graph in FIG. 9, is further multiplied with the wheel speed, and is shown as a braking force gradient with respect to slip rate.

It can be understood that an estimated value of the braking force gradient estimated according to the present embodiment agrees relatively well with the braking force gradient derived from the brush model, from the limit braking range where the braking force gradient is small to the low slip range where the braking force gradient is relatively large (near the origin), and that the braking force gradient and the break point frequency agree with each other well.

It has been described above that the braking force gradient and the break point frequency agree well with each other. Because the braking force gradient, the driving force gradient, and the road surface μ-gradient are all physical quantities representing slipperiness between the tire and the road, and are values equivalent to each other, there are similar correspondences between driving force gradient and break point frequency and between road surface μ-gradient and break point frequency. Thus, a change in the road surface μ-gradient and a reduction in tire air pressure which causes a change in the road surface μ-gradient, not only during braking but also during driving or normal travel, can be estimated by estimating an increase in break point frequency.

In the present embodiment, the friction state estimation value is independently estimated and compared with a reference value for each of four wheels, which makes it possible to detect a reduction in pressure of each wheel independently. It is therefore possible to detect not only a puncture of one wheel but also a concurrent reduction of the pressure of the four wheels due to natural leakage of air.

A second embodiment of the present invention will now be described. The present embodiment is similar to the first embodiment except as otherwise described. In the present embodiment, similar to the first embodiment, a change in frequency cut off characteristics in a frequency range including frequency lower than the torsional resonance frequency is used as friction state estimation value, and the break point frequency of the wheel speed, which represents the change in frequency cut off characteristics, is used to determine a reduction of the air pressure of one of wheels on the basis of a difference or ratio between the break point frequencies of those wheels. The wheels may be left and right of front wheels, left and right of rear wheels or a combination of one rear wheel and one front wheel diagonal from each other.

As shown in FIG. 13, a tire air pressure estimator of the present embodiment has wheel speed sensors 30R and 30L mounted to the right and left wheels, respectively, and a break point frequency estimator 32R and 32L serving as road surface friction state estimator connected to the wheel speed sensors 30R and 30L, respectively. The break point frequency of each of the right and left wheels is thus estimated.

A subtraction circuit 40 for calculating a difference between the break point frequencies of the right and left wheels is connected upstream of the low-pass filter 34A as described in the first embodiment. The determination section 34B is the same as the determination section in the first embodiment except that the determination section 34B in this embodiment calculates an absolute value of the output of the low-pass filter. Description will be omitted of a reference value setting section, which is the same as that in the first embodiment.

In the present embodiment, the break point frequencies of the left and right wheels, estimated from time series data of the wheel speeds in a manner similar to that in the first embodiment, are input to the subtraction circuit 40 which calculates any difference between the break point frequencies of the left and right wheels. Regarding the calculation in the subtraction circuit 40, the subtraction may be carried out using either of the break point frequencies of the left and right wheels as a reference. The difference between the break point frequencies of the left and right wheels is subjected to a low-pass filtering process at the low-pass filter 34A. The filtered (subjected to the low-pass filtering process) difference between the break point frequencies is input to the determination section 34B. The determination section 34B calculates the absolute value of the difference between the break point frequencies of the left and right wheels. This absolute value is compared with the reference value. It is determined that there is a reduction in the pressure due to increase in the difference between the break point frequencies of the left and right wheels if the absolute value of the difference between the break point frequencies exceeds the reference value.

In the present embodiment, an increase in the break point frequency of one wheel as a result of a reduction in pressure is estimated from a difference between estimated values of the break point frequencies of the left and right wheels. The break point frequency of the wheel speed is affected by input frequencies attributable to disturbances from the road. Thus, there is a tendency of estimating the break point frequency at a relatively high value for a smooth road surface where there is relatively many high frequency disturbances, and at a lower value for a rough asphalt road surface, where there is relatively many frequency disturbances. However, when a reduction in tire air pressure is estimated from the difference between break point frequencies of wheels, as in the present embodiment, the influence of the road surface is eliminated by calculating the difference between the break point frequencies of wheels, and it is therefore possible to accurately detect a reduction in pressure of one wheel due to a puncture or the like.

Figure 14:
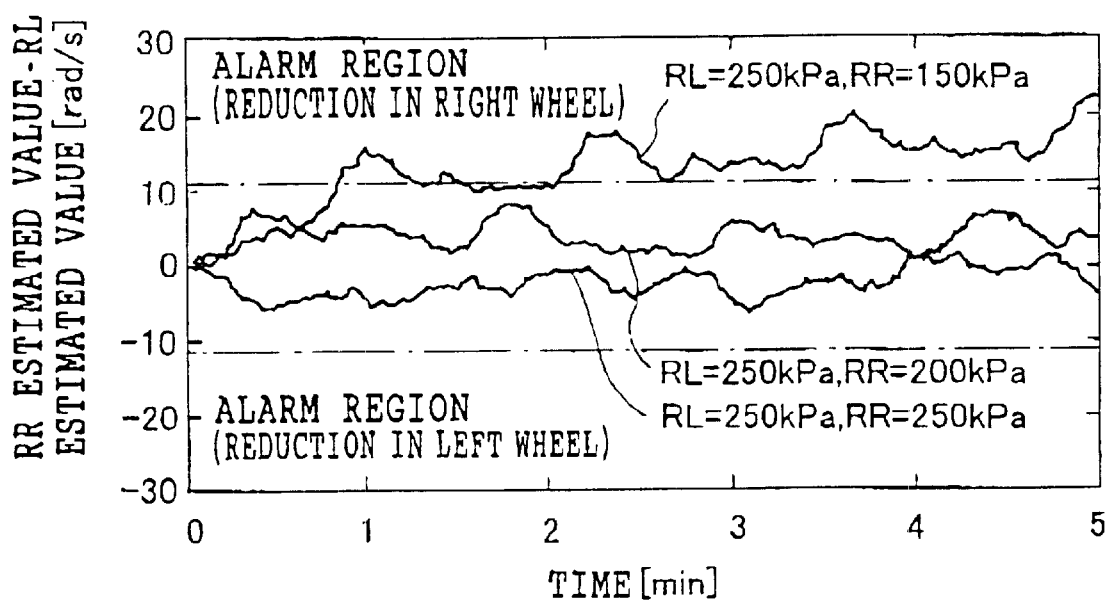
FIG. 14 is a diagram showing time series data of break point frequency differences in the second embodiment of the present invention.

FIG. 14 shows low-pass-filtered differences between the break point frequencies of left and right wheels, for rear wheels (right wheel break point frequency minus left wheel break point frequency) obtained during travel at a vehicle speed of 170 km/h with left and right wheels under the same pressure (250 kPa), with the right wheel having a pressure reduction of 50 kPa, and with the right wheel having a pressure reduction of 100 kPa. It can be seen that the break point frequency differences (subject to low-pass-filtering) increased in the positive direction as a result of the pressure reductions and that the break point frequency of the right wheel was higher than that of the left wheel. The reference value for determination of the air pressure reduction was 12 rad/s, and the pressure difference of 100 kPa between the left and right wheels raised the difference of break point frequencies (subject to low-pass-filtering) beyond the reference value in one minute from the beginning of estimation, allowing recognition of the air pressure reduction.

The above-described embodiment refers to an example in which left and right wheels are used, but front and rear wheels on either the left or right side could be used instead.

A third embodiment of the present invention will now be described. In the present embodiment, a change in frequency cut off characteristics in a frequency range including frequency lower than the torsional resonance frequency is used as friction state estimation value, and a vibration level, namely, an amplitude in a special frequency range, which represents the change in frequency cut off characteristics, is used as the friction state estimation value to determine a reduction in the tire air pressure of one of wheels on the basis of a difference or ratio between the break point frequencies of those wheels. The wheels may be left and right of front wheels, left and right of rear wheels or a combination of one rear wheel and one front wheel diagonal from each other.

Figure 15:
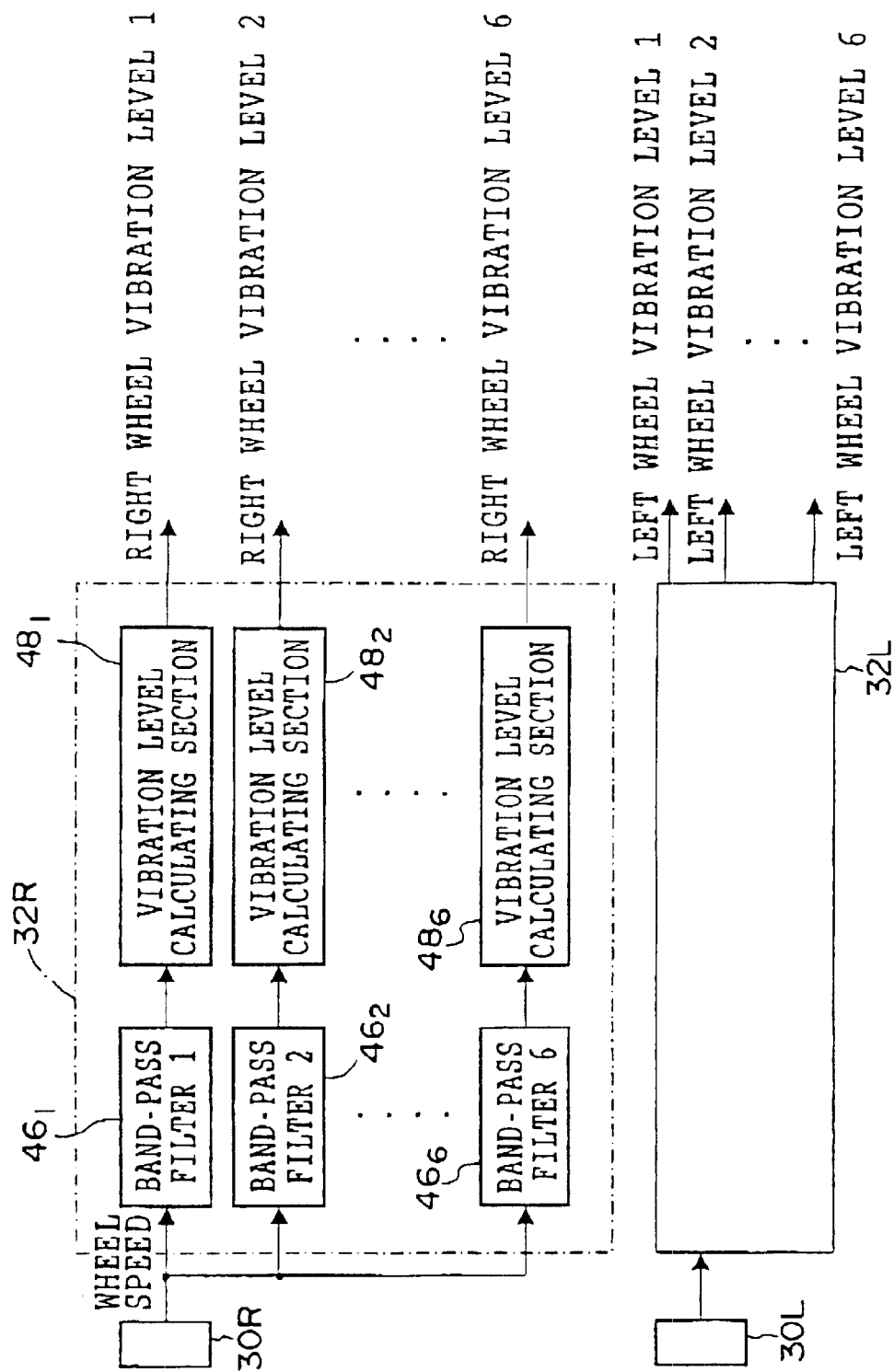
FIG. 15 is a block diagram showing a third embodiment of the present invention.
Figure 16:
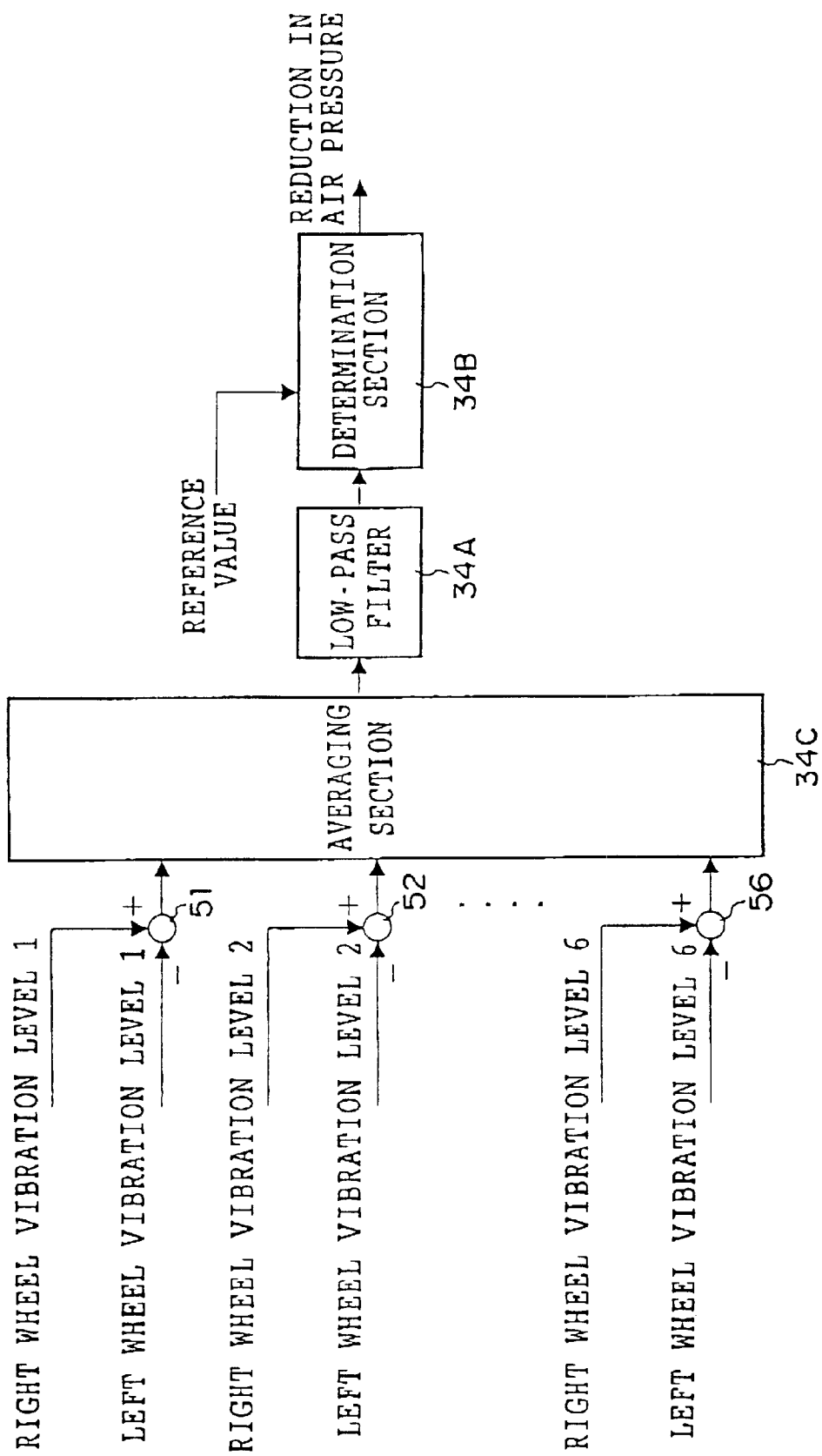
FIG. 16 is a block diagram showing tire air pressure estimator of the third embodiment of the present invention in detail.

As shown in FIG. 15, the pair of wheel speed sensors 30R and 30L are mounted to the left and right wheels respectively. The road surface friction state estimator 32R and 32L are connected to the wheel speed sensors 30R and 30L, respectively. The tire air pressure estimator 34, as shown in FIG. 16, is connected to the pair of road surface friction state estimator.

Since the road surface friction state estimator 32R and 32L have the same configuration as each other, only the road surface friction state estimator 32R will be described. The road surface friction state estimator 32R includes a plurality of band-pass filters $46_1$, $46_2$, ..., $46_6$, and a plurality of vibration level calculating section $48_1$, $48_2$, ... $48_6$ each connected to an output end of the corresponding band-pass filter.

In the present embodiment, transmission frequency bands of the band-pass filters are a plurality of frequency bands adjacent to each other which are defined by dividing an overall frequency band of interest. Specifically, the transmission frequency bands of the band-pass filters are six respective frequency bands of 15 to 17.5 Hz, 17.5 to 20 Hz, 20 to 22.5 Hz, 22.5 to 25 Hz, 25 to 27.5 Hz, and 27.5 to 30 Hz. Each vibration level calculating section calculates and outputs the vibration level or amplitude of a wheel speed signal of a frequency band which has passed through one of the band-pass filters. Thus, the road surface friction state estimator outputs the vibration level of each of the plurality of frequency bands, i.e., the six frequency bands, as the friction state estimation value. The present embodiment refers to an example in which the vibration level of each frequency band is calculated using each band-pass filter, but vibration level components of each frequency could instead be calculated using an FFT. The vibration level calculating section squares the filtered wheel speed to represent it in decibels. The left and right vibration level calculating sections output signals for right wheel vibration levels 1 through 6 and left wheel vibration levels 1 through 6, respectively.

Figure 17:
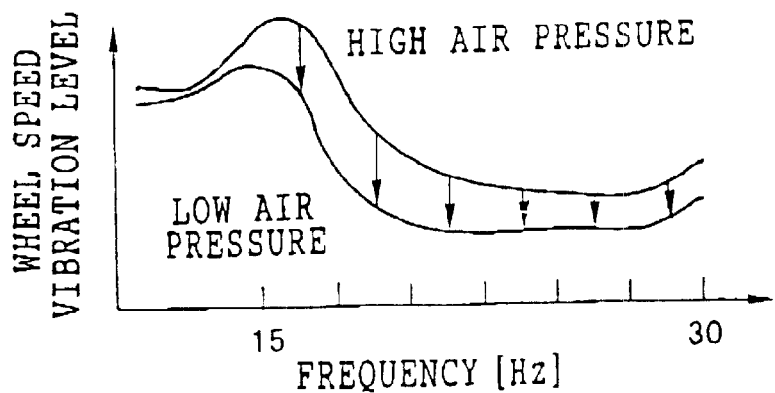
FIG. 17 is a diagram showing a reduction in vibration levels of a wheel speed signal resulting from a reduction of air pressure.

In the present embodiment, the frequency bands are set such that a difference between pressures can be easily observed with little susceptibility to the influence of vehicle turns and types of tires. The purpose of setting the divided small frequency bands of the present embodiment is to compare vibration levels in regions where the vibration levels of wheel speed are different because of the influence of suspension longitudinal direction resonance and the like, as shown in FIG. 17. Although uniformly divided frequency bands are set in the present embodiment, efficiency of calculations may be improved by setting narrower frequency bands for the region which is affected by the suspension longitudinal direction resonance characteristics and wider frequency bands in a region which is not affected by the suspension longitudinal direction resonance characteristics.

As shown in FIG. 16, the tire air pressure estimator 34 has: subtraction circuits 51 through 56, which calculate a difference between the vibration levels of the right and left wheels for each of the frequency bands; averaging section 34C for averaging the differences between the right and left wheel vibration levels which are output by the subtraction circuits 51 through 56; the low-pass filter 34A for smoothing the averaged vibration level, and the determination section 34B for comparing the absolute value of the smoothed vibration level with a preset reference value to determine, if the reference value is exceeded, that there is a reduction in tire air pressure.

The averaging section 34C may add vibration level differences and divide a sum of the vibration level differences by the number of vibration level differences to calculate and output an arithmetical mean. Alternatively, the averaging section 34C may obtain a weighted mean by taking various weights into consideration for the frequency ranges so as to tune the output such that difference between air pressures are emphasized.

By performing the averaging by taking various weights into consideration depending on the frequency range, it is possible to refer (emphasize) a frequency region where a change due to air pressure is likely to occur. This reduces the influence of differences between types of tires, and allows accurate estimation of a reduction in pressure even when different types of tires are attached to the left and right wheels.

Figure 18:
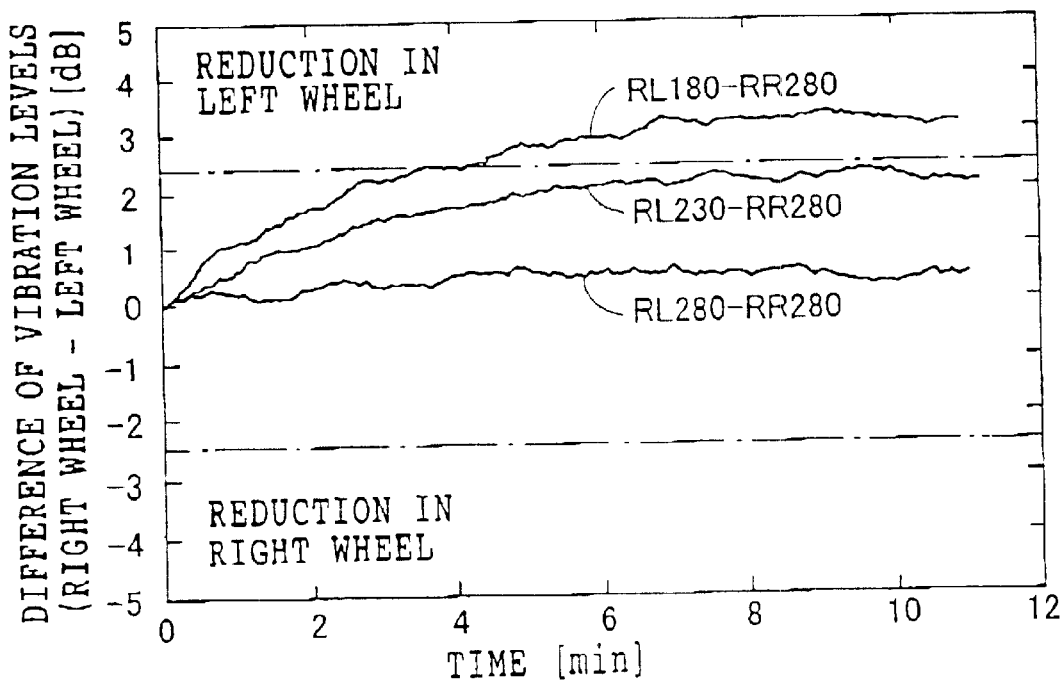
FIG. 18 is a diagram showing time series data of estimated vibration level differences.

FIG. 18 shows differences between average vibration levels of rear wheels (right wheel average vibration level minus left wheel average vibration level) after the low-pass filtering process, which were obtained for travel at a speed of 200 km/h with the left and right wheels under the same pressure (280 kPa), with the left wheel having a pressure reduction of 50 kPa, and with the left wheel having a pressure reduction of 100 kPa. It can be seen that the differences between the average vibration levels after the filtering process increased in the positive direction as the tire air pressure decreased and that the vibration level of the left wheel was lower than that of the right wheel. The reference value for determination of the air pressure reduction was 2.5 dB. When the difference between the left and right tire air pressures was 100 kPa, the difference between the vibration levels after the filtering process exceeded the reference value in four minutes after the beginning of estimation. Thus, it can be seen that a reduction in pressure can be determined.

A fourth embodiment of the present invention will now be described. In the present embodiment, a change in frequency cut off characteristics in a frequency range including frequency lower than the torsional resonance frequency, which is attributable to an increase in ground contact length, is used as friction state estimation value, To be more concrete, a difference between a vibration level in a low frequency range including frequency lower than the torsional resonance frequency and a high frequency range which is higher than the low frequency range, is used as friction state estimation value so as to recognize a reduction in the air pressure of either wheel independently. The present embodiment includes wheel speed sensors, road surface friction state estimator, tire air pressure estimator, and a display, as previously described with reference to FIG. 5.

As shown in FIG. 19, the road surface friction state estimator of the present embodiment is structured by: low frequency characteristic quantity calculating section including a first band-pass filter 40A for extracting a wheel speed signal in a low frequency range and a first vibration level calculating section 42A for calculating a vibration level from the wheel speed signal after filtering; high frequency characteristic quantity calculating section including a second band-pass filter 40B for extracting a wheel speed signal in a high frequency range and a second vibration level calculating section 42B for calculating a vibration level from the wheel speed signal after filtering; and characteristic quantity calculating section 44 for outputting a difference between a low frequency characteristic quantity calculated by the low frequency characteristic quantity calculating section and a high frequency characteristic quantity calculated by the high frequency characteristic quantity calculating section, to serve as the friction state estimation value.

The first band-pass filter 40A of the low frequency characteristic quantity calculating section is set with a transmission frequency so as to transmit wheel speed signals in a region of relatively low frequency of wheel speed motion. The first band-pass filter 40A in the present embodiment is set to transmit wheel speed signals at frequencies from 15 to 30 Hz. The second band-pass filter 40B of the high frequency characteristic quantity calculating section is set with a transmission frequency so as to transmit wheel speed signals in a region of relatively high frequency of wheel speed motion. The second band-pass filter 40B in the present embodiment is set to transmit wheel speed signals at frequencies from 30 to 50 Hz.

The first vibration level calculation (detection) section 42A squares the wheel speed signal transmitted by the band-pass filter 40A and outputs a signal indicating a vibration level in decibels to serve as the low frequency characteristic quantity. The second vibration level calculation (detection) section 42B squares a wheel speed signal transmitted by the band-pass filter 40B and outputs a signal indicating a vibration level in decibels to serve as the high frequency characteristic quantity.

The characteristic quantity calculating section 44 outputs a difference between the low frequency characteristic quantity and the high frequency characteristic quantity to serve as the friction state estimation value.

Figure 4:
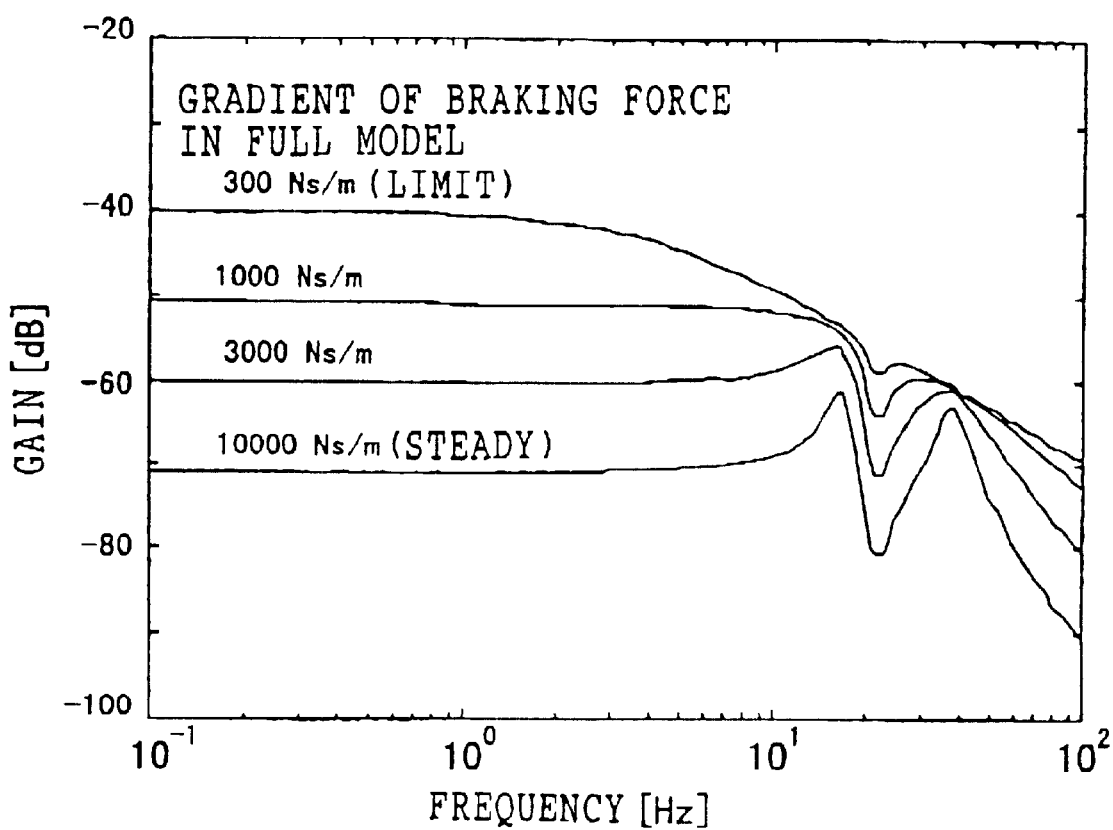
FIG. 4 is a gain diagram showing frequency responses from road surface disturbances to wheel speed.

As previously described with reference to FIG. 4, in a region where the air pressure is normal, namely, the $\mu$-gradient of the road surface (equivalent to the braking force gradient in FIG. 4) is relatively small, the frequency characteristics of the wheel speed exhibit high gain in the low frequency range and low gain in the high frequency range. Therefore, the friction state estimation value indicating the difference between the gain in the low frequency range and the gain in the high frequency range is large. In contrast, in a region where a reduction of pressure has occurred, namely, the road surface $\mu$-gradient is relatively large, the frequency characteristics of the wheel speed signals exhibit that the gain in low frequency range is smaller than that for the region where the $\mu$-gradient of the road surface is relatively small. Further, gain in high frequency range does not so much smaller compared to that for the region where the road surface $\mu$-gradient is relatively small, for reasons such as the occurrence of rotational resonance of the tire. This leads to a small friction state estimation value. Therefore, the friction state estimation value indicating the difference (or ratio) between the vibration level in the low frequency range and the vibration level in the high frequency range decreases as the road surface $\mu$-gradient increases due to a reduction in pressure. A reduction in tire air pressure can be recognized from the difference as described above by utilizing this property of the value.

As described with reference to FIG. 6, the tire air pressure estimator has the low-pass filter for performing low-pass filtering on the friction state estimation value for each wheel and the determination section for comparing the filtered friction state estimation value with the reference value to determine, if the friction state estimation value exceeds the reference value, that there has been a reduction in pressure.

The low-pass filter is provided to reduce variations of estimation of the friction state estimation value due to road surface disturbances. The frequency characteristics of the filter is set such that variations of estimation can be reduced but the estimated value can adequately follow any change in the air pressure in the case of a puncture.

In the present embodiment, the friction state estimation value for each of four wheels is independently estimated and compared with a reference value. It is therefore possible to detect a reduction of the pressure of each wheel independently. As a result, a concurrent reduction of the air pressure of the four wheels due to natural leakage, a puncture of one of the wheels, or the like can be detected.

A fifth embodiment of the present invention will now be described. The present embodiment is similar to the third embodiment in that vibration levels in a plurality of frequency ranges are used as friction state estimation values from which a reduction in tire air pressure can be detected. As previously described with reference to FIG. 5, the present embodiment has wheel speed sensors, road surface friction state estimator, tire air pressure estimator, and a display. Parts of the present embodiment corresponding to those in FIG. 15 are described using the same reference numbers.

Figure 20:
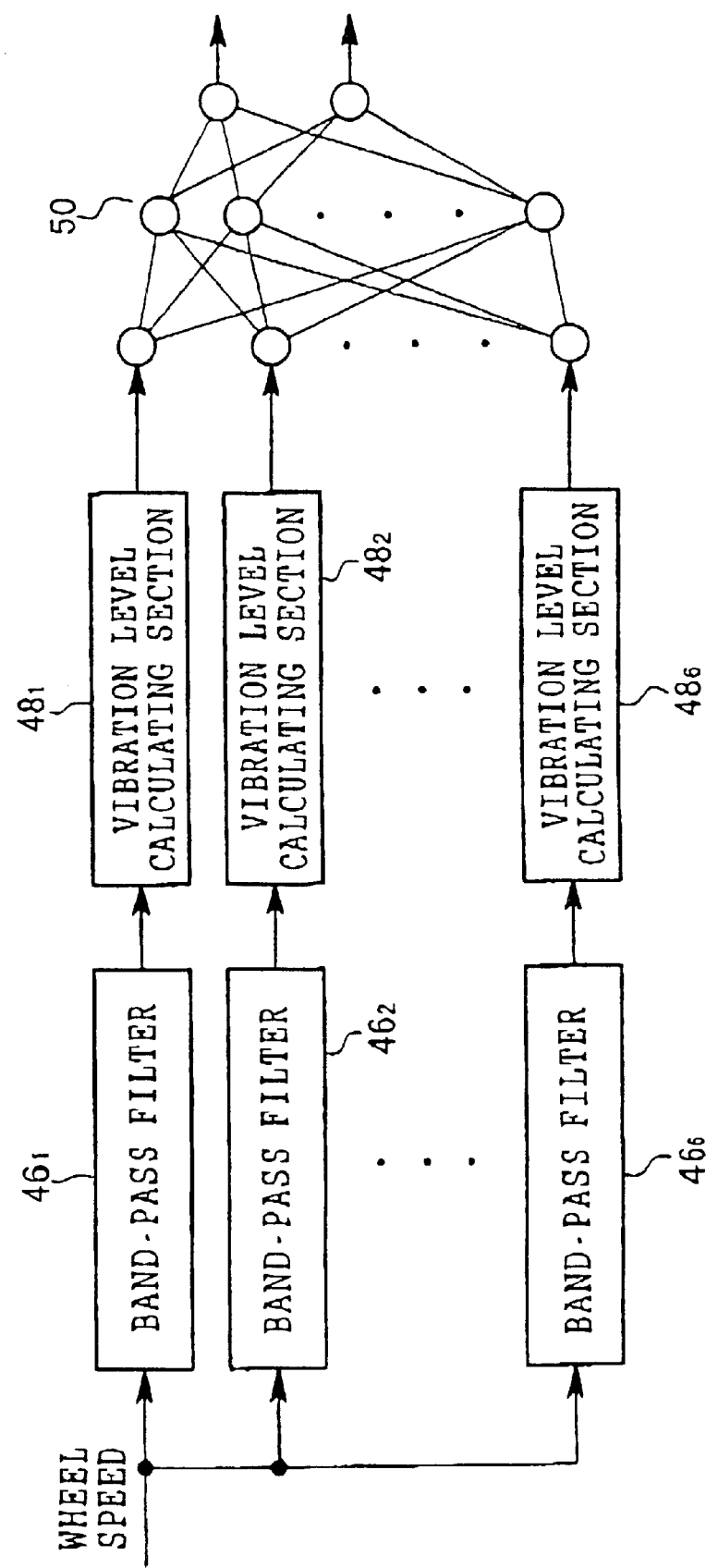
FIG. 20 is a block diagram showing a fifth embodiment of the present invention.

As shown in FIG. 20, a friction value estimation calculating section of the present embodiment has the plurality of band-pass filters $46_1$, $46_2$, . . . , $46_6$ and the plurality of vibration level calculating section $48_1$, $48_2$, . . . $48_6$ connected to the output ends of the band-pass filters. Air pressure reduction estimator 50 constituted by a neural network is connected to the plurality of vibration level calculating section.

In the present embodiment, the transmission frequency bands of the band-pass filters are defined by dividing the overall frequency band of interest into a plurality of frequency bands adjacent to each other. Specifically, the transmission frequency bands of the band-pass filters are six respective frequency bands of 10 to 20 Hz, 20 to 30 Hz, 30 to 40 Hz, 40 to 50 Hz, 50 to 60 Hz, and 60 to 70 Hz. The friction state estimation value calculating section outputs a vibration level for each of the plurality of frequency bands (six frequency bands) as the friction state estimation value. Although an example of using a band-pass filter for calculation of the vibration level for each frequency band is described for the present embodiment, the frequency components could be calculated using an FFT.

As described above, in the case of usual air pressure and a small road surface $\mu$-gradient, gain falls off from a low frequency because the break point frequency of the wheel speed is low. In the case of reduced air pressure and a large road surface $\mu$-gradient, gain reduction does not occur until a high frequency because the break point frequency of the wheel speed is high. It is therefore possible to recognize an air pressure reduction by comparing vibration levels in each frequency range.

The tire air pressure estimator estimates an increase in the road surface $\mu$-gradient resulting from a reduction of pressure, from the vibration levels in the frequency bands as the friction state estimation values, by using the neural network and taking advantage of the fact that the break point frequency changes depending on the $\mu$-gradient of the road. The neural network has a three-layer configuration with an input layer, an intermediate layer, and an output layer. The network receives input of the six vibration levels and estimates two levels of air pressure reduction. Learning of the neural network is carried out with a back propagation method using frequency characteristics of wheel speed under two air pressures, i.e., high and low air pressures. Thus, the neural network learns the property of increasing of the vibration frequency in each frequency band when the road surface $\mu$-gradient increases as a result of a reduction in pressure, thus, capable of estimating a reduction in the air pressure from the vibration levels in the frequency bands.

Figure 21:
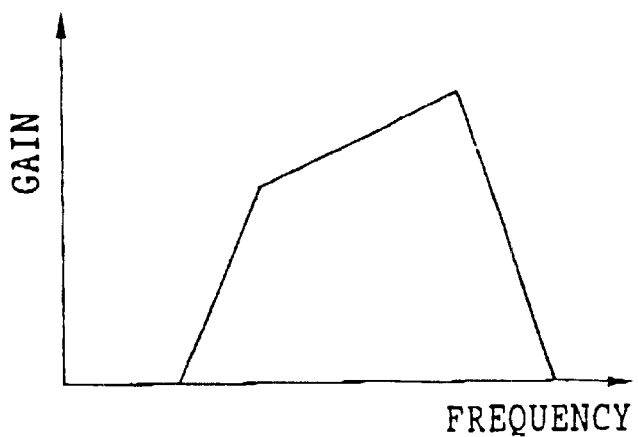
FIG. 21 is a diagram showing a characteristics of a frequency-weighted filter.
Figure 22:
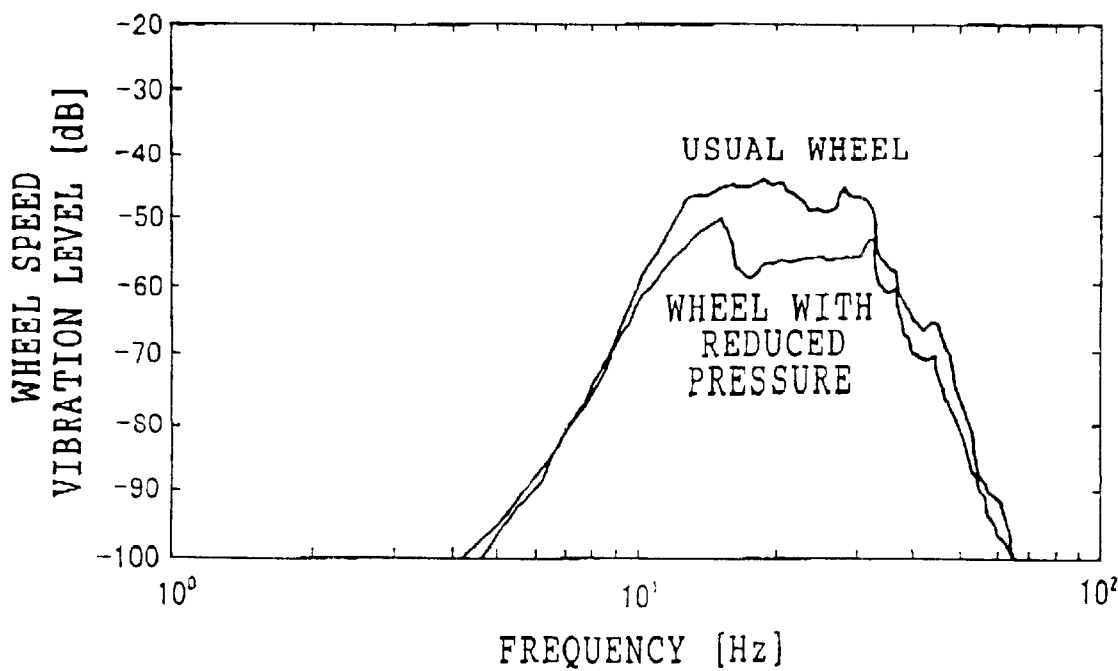
FIG. 22 is a diagram for comparing vibration levels of a usual wheel and a wheel with low air pressure subject to processing with the frequency-weighted filter.

A sixth embodiment of the present invention will now be described. In the present embodiment, the plurality of band-pass filters in the third embodiment are replaced with a single band-pass filter. In the third embodiment, the frequency range is divided into the plurality of frequency bands as shown in FIG. 17 in order to detect the differences between the vibration levels of the left and right wheels, the vibration level difference in each frequency band is calculated, and the air pressure reduction is detected using the average value of the vibration level differences. The present embodiment takes advantage of the fact that a PSD (power spectral density) of a wheel speed signal in a special frequency range to be referred (15 to 30 Hz, for example) becomes lower as the frequency increases. A reduction in the frequency for one of the left and right wheels is estimated from a difference between filtered vibration levels of those wheels, utilizing a frequency-weighted filter which provides a higher gain in a high frequency band, as shown in FIG. 21. FIG. 22 shows a PSD during processing of a wheel speed signal utilizing the frequency-weighted filter. As can be seen from FIG. 22, by processing the wheel speed signal utilizing the frequency-weighted filter, a reduction in the vibration level of a wheel having reduced pressure is emphasized by comparison with a wheel having a usual air pressure.

Figure 23:
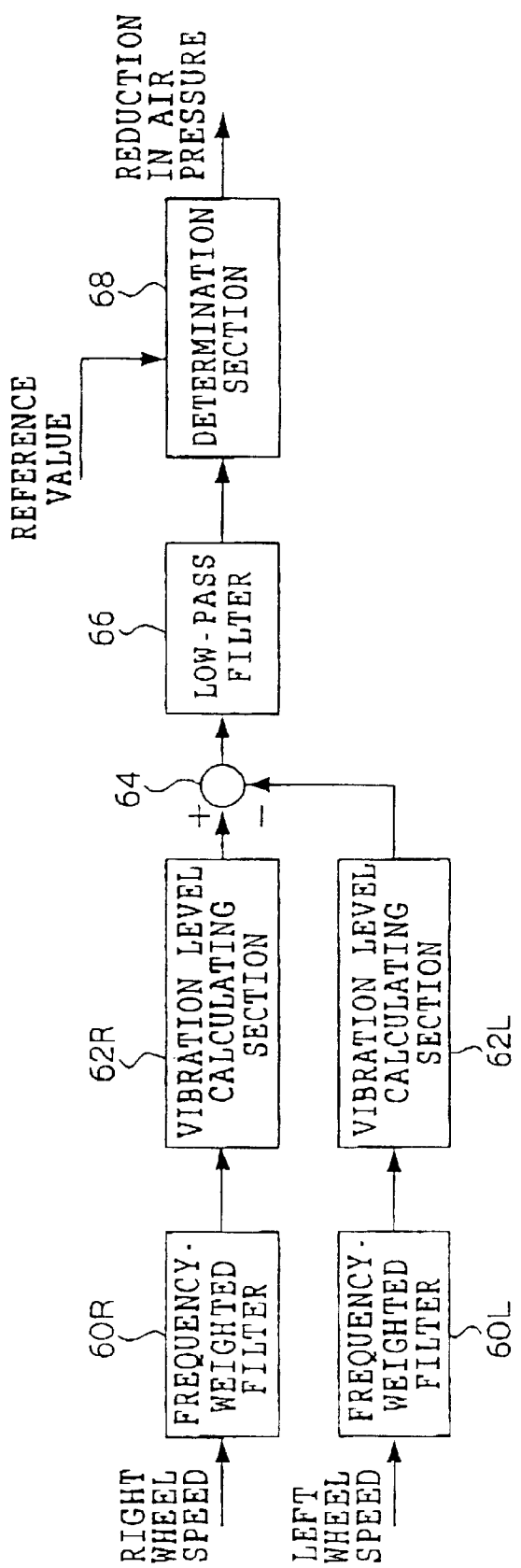
FIG. 23 is a block diagram showing a sixth embodiment of the present invention.
Figure 25:
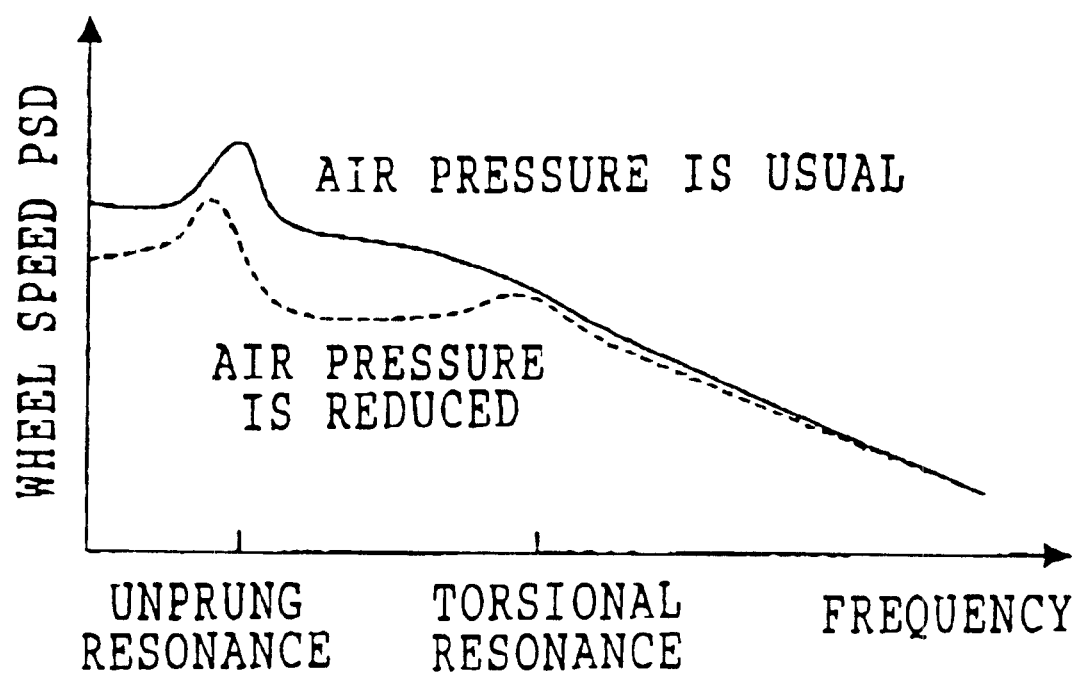
FIG. 25 is a diagram showing relationships between frequency and PSD of wheel speed for comparison of cases of normal tire air pressure and reduced tire air pressure.

As shown in FIG. 23, the sixth embodiment has a configuration including frequency-weighted filters 60R and 60L connected to a pair of wheel speed sensors (not shown) mounted to right and left wheels, and a pair of vibration level calculating section 62R and 62L connected to the frequency-weighted filters 60R and 60L, respectively for, calculating the vibration levels of filtered signals.

Output ends of the vibration level calculating section 62R and 62L are connected to a subtraction circuit 64 which calculates a difference between the vibration level calculated by the vibration level calculating section 62R and the vibration level calculated by the vibration level calculating section 62L. As described previously, the subtraction circuit 64 is connected to a low-pass filter 66 for performing low-pass filtering to reduce variations of estimation due to noise and the like caused by the road surface disturbances. The low-pass filter 66 is connected to determination section 68 which compares the difference after low-pass filtering with a reference value, and determines that there has been a reduction in tire air pressure if the difference exceeds the reference value (i.e., if the difference has increased), and then outputs a determination signal indicating the reduction in pressure.

As shown in FIG. 21, the frequency-weighted filters 60R and 60L are band-pass filters having frequency characteristics in which the gain increases in the high frequency range, and these filters are set so as to make the vibration level of the wheel speed substantially flat over a frequency range in which characteristics are likely to change when the air pressure changes.

The vibration level calculating section squares the wheel speed signal which has been processed by the frequency-weighted filter and calculates the vibration level of the wheel speed signal for each wheel, which is expressed in decibels, using logarithmic calculations.

The low-pass filter smoothes the estimated value by filtering the difference between the vibration levels of the wheels, The determination section multiplies the smoothed difference between the vibration levels of the left and right wheels by a gain related to the vehicle speed, calculates an estimated value of difference between the air pressures of the left and right wheels, compares the estimated value with the reference value and, if the estimated value exceeds the reference value, determines that there has been a reduction in the pressure and outputs an alarm of the reduction of pressure FIG. 24 shows results of estimation of differences between the air pressures of left and right wheels carried out according to the present embodiment during steady travel at 190 km/h with the air pressure of the left rear wheel reduced relative to the air pressure of the right rear wheel by 0 kPa, 50 kPa, and 100 kPa. When the air pressure of the left rear wheel was reduced by 100 kPa, the difference value exceeded the reference value about four minutes after the beginning of estimation, which resulted in a determination that there had been the reduction in air pressure.

In the present embodiment, a ratio between vibration levels may be used instead of a difference between them.

The present embodiment employs frequency-weighted filters to provide a configuration including only one band-pass filter. This is advantageous compared to embodiments employing a plurality of band-pass filters in that calculation load can be reduced.

In the above-described embodiment in which a reduction of pressure of each wheel is estimated, road surface friction state estimator may be provided for each of left and right wheels so as to detect a reduction in tire air pressure without being affected by the road on which the vehicle is traveling, by calculating a difference or ratio between friction state estimation values.

In the above described embodiments, the examples of use of a change in frequency cut off characteristics. However, instead of use of the change in frequency cut off characteristics, it may be possible that a change in vibration suppression characteristics in a frequency range including frequency lower than the torsional resonance frequency, which is attributable to an increase in ground contact length, is used as friction state estimation value and estimated, and a reduction in tire air pressure is detected by comparing the estimated change in vibration suppression characteristics.

As described above, the present invention is advantageous in that a tire air pressure estimating apparatus can be provided which is capable of detecting the pressure of a tire of a driving wheel, even during high speed travel, without using a sensor for detecting the tire air pressure directly.

Also, the present invention are advantageous in that the pressure of either of left and right wheels (for example, the case of puncture of either of the wheels) can be accurately estimated free of influence of the road surface on which the vehicle is traveling, because the tire air pressure is estimated based on a difference or ratio between friction state estimation values of the wheels.

What is claimed is:

1. A tire air pressure estimating apparatus comprising:
    a wheel speed sensor for detecting a wheel speed;
    a road surface friction state estimator for estimating a friction state estimation value which represents friction state between a road surface and a tire on the basis of the wheel speed detected by the wheel speed sensor; and
    a tire air pressure estimator for estimating pressure of the tire on the basis of the friction state estimation value estimated by the road surface friction state estimator.

2. A tire air pressure estimating apparatus comprising:
    a wheel speed sensor for detecting wheel speed of a single wheel;
    a tire air pressure estimator for estimating pressure of a tire, on the basis of the wheel speed detected by the wheel speed sensor, from a change in frequency cut off characteristics in a frequency range including frequency lower than a torsional resonance frequency, in a wheel speed frequency characteristics.

3. A tire air pressure estimating apparatus comprising:
    wheel speed sensors for detecting respective wheel speeds of a plurality of wheels;
    tire air pressure estimator for estimating pressures of tires, based on the respective wheel speeds of the plurality of wheels that are detected by the wheel speed sensors, from one of:
        a change in frequency cut off characteristics in a frequency range including frequency lower than a torsional resonance frequency of wheel speed frequency characteristics, and
        a change in vibration suppression characteristics in the frequency range including frequency lower than the torsional resonance frequency.

4. A tire air pressure estimating apparatus comprising:
    a wheel speed sensor for detecting a wheel speed of a single wheel;
    a detection section for detecting, based on a wheel speed signal that is output from the wheel speed sensor, characteristic quantities of the wheel speed signal in each of a plurality of frequency ranges; and a tire air pressure estimator for estimating pressure of a tire by comparing the plurality of characteristic quantities detected by the detection section.

5. A tire air pressure estimating apparatus comprising:

wheel speed sensors for detecting respective wheel speeds of a plurality of wheels;

detection sections for detecting, based on the respective wheel speeds of the plurality of wheels detected by the wheel speed sensors, for each of the plurality of the wheels, at least one of:
  characteristic quantities of the wheel speed signal in a plurality of frequency bands, or
  a characteristic quantity of the wheel speed signal in a special frequency range, the wheel speed signal in the special frequency range being obtained by processing the wheel speed signal using a frequency-weighted filter which makes gain high at a higher frequency range of the special frequency range; and a tire air pressure estimator for estimating pressures of tires by relatively comparing the respective characteristic quantities of the wheel speed signal detected by the detection section.

6. A tire air pressure estimating apparatus according to claim 5, wherein the tire air pressure estimator compares a difference or ratio between the characteristic quantities of the wheel speed signal with a reference value, so as to relatively compare the characteristic quantities.

7. A tire air pressure estimating apparatus comprising:

a wheel speed sensor for detecting wheel speed of a single wheel;

a detection section for detecting, based on a wheel speed signal that is output by the wheel speed sensor, a characteristic quantity of the wheel speed signal in a low frequency range including frequency lower than a torsional resonance frequency and a characteristic quantity of the wheel speed signal in a high frequency range which is higher than the low frequency range, a tire air pressure estimator for estimating pressure of a tire by relatively comparing the characteristic quantities detected by the detection section.

8. A tire air pressure estimating apparatus according to claim 7, wherein the tire air pressure estimator compares a difference or ratio between the characteristic quantities of the wheel speed signal in the low frequency range and the high frequency range, with a reference value, so as to relatively compare the characteristic quantities.

9. A tire air pressure estimating apparatus according to claim 7, wherein the characteristic quantities are vibration levels.

10. A tire air pressure estimating apparatus comprising:

wheel speed sensors for detecting respective wheel speeds of a plurality of wheels;

road surface friction state estimators for, on the basis of the respective wheel speeds of the plurality of wheels detected by the wheel speed sensors, estimating a friction state estimation values, which represent friction states between a tire and a road surface; and a tire air pressure estimator for estimating pressures of the tires on the basis of the friction state estimation values estimated by the road surface friction state estimators.

11. A tire air pressure estimating apparatus according to claim 10, wherein the road surface friction state estimator estimates, as the friction state estimation value, one of:

a change in frequency cut off characteristics in a frequency range including frequency lower than a torsional resonance frequency, which is attributable to an increase in ground contact length, in a wheel speed frequency characteristics, and a change in vibration suppression characteristics in the frequency range including frequency lower than the torsional resonance frequency, which is attributable to the increase in the ground contact length.

12. A tire air pressure estimating apparatus according to claim 10, wherein the road surface friction state estimator estimates, as the friction state estimation value, for each of the plurality of the wheels, at least one of:

(a) in a transmission characteristics, form road surface disturbance to the wheel speed, approximated to a low order model, a frequency, at which gain changes from a value in a predetermined range to a value out of the predetermined range, in a gain diagram representing a frequency response of the approximated model;

(b) a vibration level of a wheel speed signal in a special frequency band; and (c) a vibration level of the wheel speed signal in a special frequency range, the wheel speed signal being obtained by processing using frequency-weighted filter which makes gain high at a higher frequency range of the special frequency range.

13. A tire air pressure estimating apparatus according to claim 12, wherein the tire air pressure estimator estimates the tire air pressure by one of:

(1) comparing a difference or ratio between the estimated frequencies, at which gain changes from the value in the predetermined range to the value out of the predetermined range, in the gain diagram representing the frequency response of the approximated model, with a reference value, and (2) comparing a difference or ratio between the estimated vibration levels of the wheel speed signals in the special frequency band, with a reference value; and (3) comparing a difference or ratio between the estimated vibration levels of the wheel speed signals in the special frequency range, the wheel speed signal being obtained by processing using frequency-weighted filter which makes gain high at the higher frequency range of the special frequency range, with a reference value.

14. A tire air pressure estimating apparatus comprising:

a wheel speed sensor for detecting a wheel speed of a single wheel;

a road surface friction state estimator for estimating a friction state estimation value, which represents friction state between a tire and a road surface, based on the wheel speed detected by the wheel speed sensor; and a tire air pressure estimator for estimating pressure of the tire on the basis of the friction state estimation value estimated by the road surface friction state estimator.

15. A tire air pressure estimating apparatus according to claim 14, wherein the road surface friction state estimator estimates, as the friction state estimation value, a change in frequency cut off characteristics in a frequency range including frequency lower than a torsional resonance frequency, which is attributable to an increase in ground contact length, in a wheel speed frequency characteristics.

16. A tire air pressure estimating apparatus according to claim 14, wherein the road surface friction state estimator estimates, as the friction state estimation value, at least one of:

(a) in a transmission characteristics, from road surface disturbance to the wheel speed, approximated to a low order model, a frequency, at which gain changes from a value in a predetermined range to a value out of the predetermined range, in a gain diagram representing a frequency response of the approximated model; and (b) one of a difference or ratio between a characteristic quantity in a low frequency range including frequency lower than a torsional resonance frequency and a characteristic quantity in a high frequency range which is higher than the low frequency range, in a gain diagram representing a frequency response of a transmission characteristics, from the road surface disturbance to the wheel speed.

17. A tire air pressure estimating apparatus according to claim 14, wherein the road surface friction state estimator estimates, as the friction state estimation values, vibration levels of a wheel speed signal in a plurality of frequency bands.

18. A tire air pressure estimating apparatus according to claim 15, wherein the tire air pressure estimator estimates the tire air pressure by comparing the friction state estimation value with a reference value.

19. A tire air pressure estimating apparatus according to claim 16, wherein the both characteristic quantities are vibration levels of a wheel speed signal.

20. A tire air pressure estimating apparatus according to claim 17, wherein the tire air pressure estimator estimates the tire air pressure by comparing the vibration levels of the wheel speed signal in the plurality of frequency bands.

* * * * *